(12) United States Patent
Li et al.

(10) Patent No.: US 11,909,539 B2
(45) Date of Patent: Feb. 20, 2024

(54) WIRELESS COMMUNICATION METHOD AND APPARATUS FOR IMPROVING ROBUSTNESS OF DATA TRANSMISSION

(71) Applicant: HUAWEI TECHNOLOGIES CO., LTD., Shenzhen (CN)

(72) Inventors: Junchao Li, Shanghai (CN); Hao Tang, Shanghai (CN); Guohua Zhou, Shanghai (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 17/342,930

(22) Filed: Jun. 9, 2021

(65) Prior Publication Data

US 2021/0297201 A1    Sep. 23, 2021

Related U.S. Application Data

(63) Continuation of application No. PCT/CN2019/117046, filed on Nov. 11, 2019.

(30) Foreign Application Priority Data

Dec. 10, 2018 (CN) .......................... 201811503889.X

(51) Int. Cl.
*H04L 1/00* (2006.01)
*H04L 1/22* (2006.01)

(52) U.S. Cl.
CPC ...................................... *H04L 1/22* (2013.01)

(58) Field of Classification Search
CPC .......... H04L 1/22; H04L 47/12; H04W 72/23; H04W 76/14; H04W 40/22
See application file for complete search history.

(56) References Cited

U.S. PATENT DOCUMENTS 9,100,955 B2 * 8/2015 Nakao .................... H04L 5/0032
10,492,205 B2 * 11/2019 Chen .................... H04J 11/0056
(Continued)

FOREIGN PATENT DOCUMENTS

CN       103327637 A    9/2013
CN       103444118 A    12/2013
(Continued)

OTHER PUBLICATIONS

Qualcomm Japan Inc, Update on Applicability and Procedure for generic duplex mode RRM test case 8.16.86. 3GPP TSG-RAN5 Meeting #81, Spokane, United States, Nov. 12, 2018-Nov. 16, 2018, R5-187854, 14 pages.
(Continued)

*Primary Examiner* — Abdelnabi O Musa
(74) *Attorney, Agent, or Firm* — Rimon PC

(57) ABSTRACT

Embodiments of this application disclose a wireless communication method and an apparatus, to improve robustness of data transmission between a terminal device and a node device. The method in the embodiments of this application includes: A terminal device incorrectly receives first data in a first cell, where the first cell is a first primary cell. The terminal device sends first indication information in a second cell, where the second cell is a secondary cell or a second primary cell, and the first indication information is used to indicate that the first data is incorrectly received in the first cell, or is used to request transmission of the first data in the second cell. The terminal device receives the first data in the second cell.

8 Claims, 12 Drawing Sheets

(56) References Cited

U.S. PATENT DOCUMENTS

| | | | | |
|---|---|---|---|---|
| 2010/0129055 | A1* | 5/2010 | Lorphelin | G11B 20/00934 |
| | | | | 386/252 |
| 2012/0213170 | A1* | 8/2012 | Choi | H04L 5/001 |
| | | | | 370/329 |
| 2015/0085646 | A1* | 3/2015 | Vannithamby | H04L 1/12 |
| | | | | 370/228 |
| 2016/0073394 | A1* | 3/2016 | Kim | H04W 72/21 |
| | | | | 370/329 |
| 2018/0103388 | A1* | 4/2018 | Dinan | H04L 5/0096 |
| 2018/0295641 | A1* | 10/2018 | Wang | H04J 3/16 |
| 2018/0332604 | A1* | 11/2018 | Lee | H04W 72/20 |
| 2020/0036489 | A1* | 1/2020 | Wang | H04L 5/00 |
| 2021/0336755 | A1* | 10/2021 | Xiao | H04L 5/0092 |
| 2022/0086853 | A1* | 3/2022 | Xiao | H04W 72/12 |
| 2022/0264433 | A1* | 8/2022 | Xiao | H04W 24/10 |

FOREIGN PATENT DOCUMENTS

| | | |
|---|---|---|
| CN | 104581843 A | 4/2015 |
| CN | 105122704 A | 12/2015 |
| CN | 105594141 A | 5/2016 |
| CN | 107154840 A | 9/2017 |
| CN | 108377567 A | 8/2018 |
| CN | 108809480 A | 11/2018 |
| CN | 108809594 A | 11/2018 |
| EP | 2934056 A1 | 10/2015 |
| WO | 2014109580 A2 | 7/2014 |

OTHER PUBLICATIONS

Zhong Chongxian et al., User scheduling and power allocation for the downlink of multi-cell systems with universal frequency reuse. Chinese High Technology Letters, 2009, vol. 19, No. 11, 6 pages.

3GPP TR 38.802 V14.2.0 (Sep. 2017), 3rd Generation Partnership Project; Technical Specification Group Radio Access Network; Study on New Radio Access Technology Physical Layer Aspects(Release 14), 92 pages.

Ru Qingzhe et al., Secondary cells activation and deactivation during the carrier aggregation process. Microcomputer and Its Applications, 2015, vol. 34, No. 20, 4 pages.

3GPP TS 22.261 V16.5.0 (Sep. 2018), 3rd Generation Partnership Project; Technical Specification Group Services and System Aspects; Service requirements for the 5G system; Stage 1(Release 16), 67 pages.

\* cited by examiner

WIRELESS COMMUNICATION METHOD AND APPARATUS FOR IMPROVING ROBUSTNESS OF DATA TRANSMISSION

CROSS-REFERENCE TO RELATED APPLICATIONS

This application is a continuation of International Application No. PCT/CN2019/117046, filed on Nov. 11, 2019, which claims priority to Chinese Patent Application No. 201811503889.X, filed on Dec. 10, 2018. The disclosures of the aforementioned applications are hereby incorporated by reference in their entireties.

TECHNICAL FIELD

Embodiments of this application relate to the field of communication technologies, and in particular, to a wireless communication method and an apparatus.

BACKGROUND

With continuous development of science and technology, smart factories emerge. A smart factory has the following characteristics: dense network deployment, where for example, a distance between base stations may reach 20 m; a relatively large transmit power, where for example, a transmit power of a base station may reach 24 dBm per 20 MHz, and a transmit power of a terminal device may reach 23 dBm; relatively heavy network load, where for example, there are a large quantity of activated terminal devices, and data packets are relatively large; and a low-latency and high-reliability service transmission requirement, where for example, data transmission in the smart factory includes an enhanced mobile broadband (eMBB) service and an ultra-reliable low-latency communication (URLLC) service that have the low-latency and high-reliability transmission requirement.

Due to environmental impact of the smart factory, for example, mobility of a device such as a robotic arm or an automated guided vehicle (AGV), a radio link between a base station and a terminal device usually fails due to factors such as fading and blocking. Consequently, robustness of data transmission between the base station and the terminal device is relatively low.

SUMMARY

Embodiments of this application provide a wireless communication method and an apparatus, to improve robustness of data transmission between a terminal device and a node device.

A first aspect of the embodiments of this application provides a wireless communication method, including:

A terminal device receives first data in a first cell, where the first cell is a first primary cell. When determining that the first data is incorrectly received in the first cell, the terminal device sends first indication information in a second cell, where the second cell is a secondary cell or a second primary cell, and the first indication information is used to indicate that the terminal device incorrectly receives the first data in the first cell, or is used to request to transmit, in the second cell, the first data to the terminal device. The terminal device receives the first data in the second cell. It can be learned from the first aspect that after incorrectly receiving the first data in the first cell, the terminal device may request, by using the indication information, to receive the first data from the second cell. This improves robustness of data transmission.

Based on the first aspect of the embodiments of this application, in a first implementation of the first aspect of the embodiments of this application, after that the terminal device sends first indication information in a second cell, the method further includes: The terminal device detects a first downlink control channel in the second cell, where the first downlink control channel is used by the terminal device to receive the first data.

Based on the first aspect of the embodiments of this application and the first implementation of the first aspect, in a second implementation of the first aspect of the embodiments of this application, the method further includes: The terminal device sends second indication information in the first cell, where the second indication information is used to indicate that the terminal device incorrectly receives the first data in the first cell, or is used to request to transmit, in the first cell, the first data to the terminal device. The terminal device receives the first data in the first cell.

Based on any one of the first aspect of the embodiments of this application and the first and the second implementations of the first aspect, in a third implementation of the first aspect of the embodiments of this application, the first indication information includes a negative acknowledgement NACK or a scheduling request SR.

Based on any one of the first aspect of the embodiments of this application and the first to the third implementations of the first aspect, in a fourth implementation of the first aspect of the embodiments of this application, the second indication information includes a NACK or an SR.

A second aspect of the embodiments of this application provides another wireless communication method, including:

A node device sends, in a first cell, first data to a terminal device, where the first cell is a first primary cell. The node device receives, in a second cell, first indication information from the terminal device, where the second cell is a secondary cell or a second primary cell, and the first indication information is used to indicate that the terminal device incorrectly receives the first data in the first cell, or is used to request to send, in the second cell, the first data to the terminal device. The node device sends, in the second cell, the first data to the terminal device. It can be learned from the second aspect that the node device may send, in both the first cell and the second cell, the first data to the terminal device. This improves robustness of data transmission.

Based on the second aspect of the embodiments of this application, in a first implementation of the second aspect of the embodiments of this application, the method further includes: The node device receives, in the first cell, second indication information from the terminal device, where the second indication information is used to indicate that the terminal device incorrectly receives the first data in the first cell, or is used to request to transmit, in the first cell, the first data to the terminal device. The node device sends, in the first cell, the first data to the terminal device.

Based on the second aspect of the embodiments of this application and the first implementation of the second aspect, in a second implementation of the second aspect of the embodiments of this application, the first indication information includes a negative acknowledgement NACK or a scheduling request SR.

Based on any one of the second aspect of the embodiments of this application and the first and the second implementations of the second aspect, in a third implementation of the second aspect of the embodiments of this application, the second indication information includes a NACK or an SR.

A third aspect of the embodiments of this application provides another wireless communication method, including:

A first node device sends, in a first cell, first data to a terminal device, where the first cell is a first primary cell. The first node device sends the first data to a second node device, where the first data is to be sent in a second cell by the second node device to the terminal device after the second node device receives first indication information, the first indication information is used to indicate that the terminal device incorrectly receives the first data in the first cell, or is used to request the second node device to send, in the second cell, the first data to the terminal device, and the second cell is a secondary cell or a second primary cell. It can be learned from the third aspect that the first node device sends the first data to the second node device, where the first data is to be sent in the second cell by the second node device to the terminal device after the second node device receives the first indication information. Therefore, in the third aspect, the first data may be sent in both the first cell and the second cell to the terminal device. This improves robustness of data transmission.

Based on the third aspect of the embodiments of this application, in a first implementation of the third aspect of the embodiments of this application, the method further includes: The first node device receives, in the first cell, second indication information from the terminal device, where the second indication information is used to indicate that the terminal device incorrectly receives the first data in the first cell, or is used to request to transmit, in the first cell, the first data to the terminal device. The first node device sends, in the first cell, the first data to the terminal device.

Based on any one of the third aspect of the embodiments of this application and the first to the first implementations of the third aspect, in a second implementation of the third aspect of the embodiments of this application, the first indication information includes a negative acknowledgement NACK or a scheduling request SR.

Based on any one of the third aspect of the embodiments of this application and the first and the second implementations of the third aspect, in a third implementation of the third aspect of the embodiments of this application, the second indication information includes a NACK or an SR.

A fourth aspect of the embodiments of this application provides another wireless communication method, including:

A second node device receives, in a second cell, first indication information from a terminal device, where the second indication information is used to indicate that the terminal device incorrectly receives first data in a first cell, or is used to request to transmit, in the first cell, the first data to the terminal device, the first cell is a first primary cell, and the second cell is a secondary cell or a second primary cell. The second node device sends, in the second cell, the first data to the terminal device. It can be learned from the fourth aspect that after incorrectly receiving the first data in the first cell, the terminal device may request, by sending the first indication information, to receive the first data from the second cell served by the second node device. This improves robustness of data transmission.

Based on the fourth aspect of the embodiments of this application, in a first implementation of the fourth aspect of the embodiments of this application, before that the second node device sends, in the second cell, the first data to the terminal device, the method further includes: The second node device receives the first data from a first node device, where the first node device is a node device corresponding to the first cell.

Based on the fourth aspect of the embodiments of this application and the first implementation of the fourth aspect, in a second implementation of the fourth aspect of the embodiments of this application, the first indication information includes a negative acknowledgement NACK or a scheduling request SR.

A fifth aspect of the embodiments of this application provides another wireless communication method, including:

A terminal device correctly receives first data in a first cell, where the first cell is a first primary cell. The terminal device sends third indication information in a second cell, where the second cell is a secondary cell or a second primary cell, and the third indication information is used to indicate that the terminal device correctly receives the first data in the first cell, or is used to request to stop transmission of the first data in the second cell. The terminal device stops receiving the first data in the second cell. It can be learned from the fifth aspect that the terminal device may indicate, by using the indication information, that a node device does not need to send the first data in the second cell. This reduces inter-cell interference and improves use efficiency of spectrum resources.

Based on the fifth aspect of the embodiments of this application, in a first implementation of the fifth aspect of the embodiments of this application, after that the terminal device sends third indication information in a second cell, the method further includes: The terminal device stops detecting a first downlink control channel in the second cell, where the first downlink control channel is used by the terminal device to receive the first data.

Based on the fifth aspect of the embodiments of this application and the first implementation of the fifth aspect, in a second implementation of the fifth aspect of the embodiments of this application, the method further includes: The terminal device sends fourth indication information in the first cell, where the fourth indication information is used to indicate that the terminal device correctly receives the first data in the first cell, or is used to request to stop transmission of the first data in the first cell. The terminal device stops receiving the first data in the first cell.

Based on the fifth aspect of the embodiments of this application and the first and the second implementations of the fifth aspect, in a third implementation of the fifth aspect of the embodiments of this application, the third indication information includes a positive acknowledgement ACK.

Based on the fifth aspect of the embodiments of this application and the first to the third implementations of the fifth aspect, in a fourth implementation of the fifth aspect of the embodiments of this application, the fourth indication information includes an ACK.

A sixth aspect of the embodiments of this application provides another wireless communication method, including;

A node device sends, in a first cell, first data to a terminal device, where the first cell is a first primary cell. The node device receives, in a second cell, third indication information from the terminal device, where the second cell is a secondary cell or a second primary cell, and the third indication information is used to indicate that the terminal device correctly receives the first data in the first cell, or is used to request to stop transmission of the first data in the second cell. The node device stops sending the first data in the second cell. It can be learned from the sixth aspect that after receiving the third indication information, the node device does not send the first data in the second cell, so that inter-cell interference can be reduced and use efficiency of spectrum resources can be improved while the node device configures at least two cells to transmit the first data.

Based on the sixth aspect of the embodiments of this application, in a first implementation of the sixth aspect of the embodiments of this application, the method further includes: The node device receives, in the first cell, fourth indication information from the terminal device, where the fourth indication information is used to indicate that the terminal device correctly receives the first data in the first cell, or is used to request to stop transmission of the first data in the first cell. The node device stops sending the first data in the first cell.

Based on the sixth aspect of the embodiments of this application and the first implementation of the sixth aspect, in a second implementation of the sixth aspect of the embodiments of this application, the third indication information includes a positive acknowledgement ACK.

Based on the sixth aspect of the embodiments of this application and the first and the second implementations of the sixth aspect, in a third implementation of the sixth aspect of the embodiments of this application, the fourth indication information includes an ACK.

A seventh aspect of the embodiments of this application provides another wireless communication method, including:

A second node device receives, in a second cell, third indication information from a terminal device, where the third indication information is used to indicate that the terminal device correctly receives first data in a first cell, or is used to request to stop transmission of the first data in the second cell, the first cell is a first primary cell, and the second cell is a secondary cell or a second primary cell. The second node device stops sending the first data in the second cell. It can be learned from the seventh aspect that the second node device configures the second cell to transmit the first data to the terminal device, and after receiving the third indication information, the second node device does not transmit the first data in the second cell. This reduces inter-cell interference and improves use efficiency of spectrum resources.

Based on the seventh aspect of the embodiments of this application, in a first implementation of the seventh aspect of the embodiments of this application, the third indication information includes a positive acknowledgement ACK.

An eighth aspect of the embodiments of this application provides another wireless communication method, including:

A terminal device sends a first scheduling request SR in a first cell, and sends a second SR in a second cell, where a resource used to carry the first SR corresponds to a resource used to carry the second SR, and the first SR and the second SR are used to request transmission of second data. The terminal device detects a second downlink control channel in the first cell, and detects a third downlink control channel in the second cell. The terminal device receives downlink control information DCI on at least one of the second downlink control channel and the third downlink control channel. The terminal device sends the second data based on the DCI. It can be learned from the eighth aspect that the terminal device sends the scheduling requests for the second data in at least two cells, so that robustness of transmitting the SR is improved, thereby improving robustness of transmitting the data corresponding to the SR.

Based on the eighth aspect of the embodiments of this application, in a first implementation of the eighth aspect of the embodiments of this application, the first cell is a first primary cell, and the second cell is a secondary cell or a second primary cell.

A ninth aspect of the embodiments of this application provides another wireless communication method, including:

A first node device receives, in a first cell, a first scheduling request SR from a terminal device, where a resource used to carry the first SR corresponds to a resource used to carry a second SR, the resource used to carry the second SR is a resource that carries, in a second cell, the second SR from the terminal device, and the first SR and the second SR are used to request transmission of second data. The first node device sends, in the first cell, downlink control information DCI to the terminal device, where the DCI is carried on a second downlink control channel, and the DCI includes a parameter used to transmit the second data. The first node device receives, in the first cell, the second data from the terminal device. It can be learned from the ninth aspect that the terminal device sends the scheduling requests for the second data in at least two cells, so that robustness of transmitting the SR is improved.

Based on the ninth aspect of the embodiments of this application, in a first implementation of the ninth aspect of the embodiments of this application, the method further includes: The first node device sends fifth indication information to a second node device, where the fifth indication information is used to indicate that the first node device sends the DCI in the first cell.

A tenth aspect of the embodiments of this application provides another wireless communication method, including:

A second node device receives, in a second cell, a second scheduling request SR from a terminal device, where a resource used to carry the second SR corresponds to a resource used to carry a first SR, the resource used to carry the first SR is a resource that carries, in a first cell, the first SR from the terminal device, and the first SR and the second SR are used to request transmission of second data.

The second node device sends, in the second cell, downlink control information DCI to the terminal device, where the DCI is carried on a third downlink control channel. Alternatively, the second node device receives fifth indication information from a first node device, and stops sending, in the second cell, the DCI to the terminal device, where the fifth indication information is used to indicate to stop sending the DCI, and the DCI includes a parameter used to transmit the second data. It can be learned from the tenth aspect that the terminal device sends the scheduling requests for the second data in at least two cells, so that robustness of transmitting the SR is improved.

Based on the tenth aspect of the embodiments of this application, in a first implementation of the tenth aspect of the embodiments of this application, after that the second node device sends, in the second cell, downlink control information DCI to the terminal device, the method further includes: The second node device receives, in the second cell, the second data from the terminal device.

Based on the tenth aspect of the embodiments of this application and the first implementation of the tenth aspect of the embodiments of this application, in a second implementation of the tenth aspect of the embodiments of this application, the first cell is a first primary cell, and the second cell is a secondary cell or a second primary cell.

An eleventh aspect of the embodiments of this application provides another wireless communication method, including:

A node device receives a first scheduling request SR in a first cell, and receives a second SR in a second cell, where a resource used to carry the second SR corresponds to a resource used to carry the first SR. The node device sends, in at least one of the first cell and the second cell, downlink control information DCI to a terminal device, where the DCI sent in the first cell is carried on a second downlink control channel, the DCI sent in the second cell is carried on a third downlink control channel, and the DCI includes a parameter used to transmit second data. The node device receives, in the at least one of the first cell and the second cell, the second data from the terminal device. It can be learned from the eleventh aspect that the node device receives the scheduling requests for the second data in at least two cells, so that robustness of transmitting the SR is improved.

Based on the eleventh aspect of the embodiments of this application, in a first implementation of the eleventh aspect of the embodiments of this application, the first cell is a first primary cell, and the second cell is a secondary cell or a second primary cell.

A twelfth aspect of the embodiments of this application provides another wireless communication method, including:

A terminal device obtains a first configuration parameter for a carrier bandwidth, where the carrier bandwidth is a carrier bandwidth for transmitting first data, at least two sets of configuration parameters are preconfigured for the carrier bandwidth, and the at least two sets of configuration parameters include the first configuration parameter. The terminal device determines, based on the first configuration parameter, at least one of a transmission cell, a retransmission mode, and a feedback mode of the first data. It can be learned from the twelfth aspect that, the at least two sets of configuration parameters are preconfigured for the carrier bandwidth, a node device may determine, in the at least two sets of configuration parameters based on a service type of the first data, the configuration parameter corresponding to the first data, and the terminal device may determine the transmission cell, the retransmission mode, and the feedback mode of the first data based on the configuration parameter of the carrier bandwidth. In this way, the terminal device may process the data by using the transmission cell, the retransmission mode, and the feedback mode based on different configuration parameters. This meets different data transmission requirements of different services.

Based on the twelfth aspect of the embodiments of this application, in a first implementation of the twelfth aspect of the embodiments of this application, the first configuration parameter includes at least one of a terminal device identifier, a data channel parameter, and a control channel parameter.

Based on the twelfth aspect of the embodiments of this application and the first implementation of the twelfth aspect of the embodiments of this application, in a second implementation of the twelfth aspect of the embodiments of this application, the retransmission mode includes: The terminal device incorrectly receives the first data in a first cell. The terminal device sends first indication information in a second cell, where the first indication information is used to indicate that the first data is incorrectly received in the first cell, or is used to request transmission of the first data in the second cell. The terminal device receives the first data in the second cell.

Based on the twelfth aspect of the embodiments of this application and the first and the second implementations of the twelfth aspect of the embodiments of this application, in a third implementation of the twelfth aspect of the embodiments of this application, the transmission cell includes at least the first cell and the second cell, the first cell is a first primary cell, and the second cell is a secondary cell or a second primary cell.

Based on the twelfth aspect of the embodiments of this application and the first to the third implementations of the twelfth aspect of the embodiments of this application, in a fourth implementation of the twelfth aspect of the embodiments of this application, the feedback mode includes: When incorrectly receiving the first data in the first cell, the terminal device sends the first indication information in the second cell, where the first indication information is used to indicate that the first data is incorrectly received in the first cell, or is used to request transmission of the first data in the second cell.

Based on the twelfth aspect of the embodiments of this application and the first to the fourth implementations of the twelfth aspect of the embodiments of this application, in a fifth implementation of the twelfth aspect of the embodiments of this application, the feedback mode further includes: The terminal device sends second indication information in the first cell, where the second indication information is used to indicate that the first data is incorrectly received in the first cell, or is used to request transmission of the first data in the first cell.

Based on the twelfth aspect of the embodiments of this application and the first to the fifth implementations of the twelfth aspect of the embodiments of this application, in a sixth implementation of the twelfth aspect of the embodiments of this application, the retransmission mode further includes: The terminal device correctly receives the first data in the first cell. The terminal device sends third indication information in the second cell, where the third indication information is used to indicate that the first data is correctly received in the first cell, or is used to request to stop transmission of the first data in the second cell. The terminal device stops receiving the first data in the second cell.

Based on the twelfth aspect of the embodiments of this application and the first to the sixth implementations of the twelfth aspect of the embodiments of this application, in a seventh implementation of the twelfth aspect of the embodiments of this application, the feedback mode further includes: The terminal device sends the third indication information in the second cell, where the third indication information is used to indicate that the first data is correctly received in the first cell, or is used to request to stop transmission of the first data in the second cell.

Based on the twelfth aspect of the embodiments of this application and the first to the seventh implementations of the twelfth aspect of the embodiments of this application, in an eighth implementation of the twelfth aspect of the embodiments of this application, the feedback mode further includes: The terminal device sends fourth indication information in the first cell, where the fourth indication information is used to indicate that the first data is correctly received in the first cell, or is used to request to stop transmission of the first data in the first cell.

A thirteenth aspect of the embodiments of this application provides a communications apparatus. The communications apparatus has a function of implementing behavior of the terminal device according to any one of the first aspect and the possible implementations of the first aspect, any one of the fifth aspect and the possible implementations of the fifth aspect, any one of the eighth aspect and the possible implementations of the eighth aspect, or any one of the twelfth aspect and the possible implementations of the twelfth aspect. The function may be implemented by hardware, or may be implemented by hardware executing corresponding software, or may be implemented by a combination of software and hardware. The hardware and/or the software include/includes one or more modules corresponding to the foregoing function.

A fourteenth aspect of the embodiments of this application provides a communications apparatus. The communications apparatus has a function of implementing behavior of the node device according to any one of the second aspect and the possible implementations of the second aspect, any one of the sixth aspect and the possible implementations of the sixth aspect, or any one of the eleventh aspect and the possible implementations of the eleventh aspect. The function may be implemented by hardware, or may be implemented by hardware executing corresponding software, or may be implemented by a combination of software and hardware. The hardware and/or the software include/includes one or more modules corresponding to the foregoing function.

A fifteenth aspect of the embodiments of this application provides a communications apparatus. The communications apparatus has a function of implementing behavior of the first node device according to any one of the third aspect and the possible implementations of the third aspect or any one of the ninth aspect and the possible implementations of the ninth aspect. The function may be implemented by hardware, or may be implemented by hardware executing corresponding software, or may be implemented by a combination of software and hardware. The hardware and/or the software include/includes one or more modules corresponding to the foregoing function.

A sixteenth aspect of the embodiments of this application provides a communications apparatus. The communications apparatus has a function of implementing behavior of the second node device according to any one of the fourth aspect and the possible implementations of the fourth aspect, any one of the seventh aspect and the possible implementations of the seventh aspect, or any one of the tenth aspect and the possible implementations of the tenth aspect. The function may be implemented by hardware, or may be implemented by hardware executing corresponding software, or may be implemented by a combination of software and hardware. The hardware and/or the software include/includes one or more modules corresponding to the foregoing function.

A seventeenth aspect of the embodiments of this application provides a communications apparatus. The communications apparatus includes a processor. The processor is coupled to a memory, and the memory is configured to store a program or instructions. When the program or the instructions is/are executed by the processor, the communications apparatus is enabled to perform processing or an operation performed on a terminal device side according to any one of the first aspect and the possible implementations of the first aspect, any one of the fifth aspect and the possible implementations of the fifth aspect, any one of the eighth aspect and the possible implementations of the eighth aspect, or any one of the twelfth aspect and the possible implementations of the twelfth aspect.

An eighteenth aspect of the embodiments of this application provides a communications apparatus. The communications apparatus includes a processor. The processor is coupled to a memory, and the memory is configured to store a program or instructions. When the program or the instructions is/are executed by the processor, the communications apparatus is enabled to perform processing or an operation performed on a node device side according to any one of the second aspect and the possible implementations of the second aspect, any one of the sixth aspect and the possible implementations of the sixth aspect, or any one of the eleventh aspect and the possible implementations of the eleventh aspect.

A nineteenth aspect of the embodiments of this application provides a communications apparatus. The communications apparatus includes a processor. The processor is coupled to a memory, and the memory is configured to store a program or instructions. When the program or the instructions is/are executed by the processor, the communications apparatus is enabled to perform processing or an operation performed on a first node device side according to any one of the third aspect and the possible implementations of the third aspect or any one of the ninth aspect and the possible implementations of the ninth aspect.

A twentieth aspect of the embodiments of this application provides a communications apparatus. The communications apparatus includes a processor. The processor is coupled to a memory, and the memory is configured to store a program or instructions. When the program or the instructions is/are executed by the processor, the communications apparatus is enabled to perform processing or an operation performed on a second node device side according to any one of the fourth aspect and the possible implementations of the fourth aspect, any one of the seventh aspect and the possible implementations of the seventh aspect, or any one of the tenth aspect and the possible implementations of the tenth aspect.

A twenty-first aspect of the embodiments of this application provides a storage medium. The storage medium stores a computer program or instructions. When the computer program or the instructions is/are executed, a computer is enabled to perform the method according to any possible implementation of the first aspect to the twelfth aspect.

A twenty-second aspect of the embodiments of this application provides a computer program product including instructions. When the computer program product is run on a computer, the computer is enabled to perform the method according to any possible implementation of the first aspect to the twelfth aspect.

A twenty-third aspect of the embodiments of this application provides a chip system. The chip system includes at least one processor and a communications interface. The chip system may further include a memory. The memory, the communications interface, and the at least one processor are connected to each other via a line. The at least one memory stores instructions. The instructions are executed by the at least one processor, to perform the method according to any possible implementation of the first aspect to the twelfth aspect.

A twenty-fourth aspect of the embodiments of this application provides a communications system. The communications system includes a terminal device configured to perform any one of the first aspect and the possible implementations of the first aspect, any one of the fifth aspect and the possible implementations of the fifth aspect, any one of the eighth aspect and the possible implementations of the eighth aspect, or any one of the twelfth aspect and the possible implementations of the twelfth aspect, and a node device configured to perform any one of the second aspect and the possible implementations of the second aspect, any one of the sixth aspect and the possible implementations of the sixth aspect, or any one of the eleventh aspect and the possible implementations of the eleventh aspect.

A twenty-fifth aspect of the embodiments of this application provides a communications system. The communications system includes a terminal device configured to perform any one of the first aspect and the possible implementations of the first aspect, any one of the fifth aspect and the possible implementations of the fifth aspect, any one of the eighth aspect and the possible implementations of the eighth aspect, or any one of the twelfth aspect and the possible implementations of the twelfth aspect, a first node device configured to perform any one of the third aspect and the possible implementations of the third aspect or any one of the ninth aspect and the possible implementations of the ninth aspect, and a second node device configured to perform any one of the fourth aspect and the possible implementations of the fourth aspect, any one of the seventh aspect and the possible implementations of the seventh aspect, or any one of the tenth aspect and the possible implementations of the tenth aspect.

It can be learned from the foregoing technical solutions that the embodiments of this application have the following advantages:

In the embodiments, at least two cells are configured on a node device side. The node device sends, in the first cell, the first data to the terminal device. When incorrectly receiving the first data in the first cell, the terminal device sends the first indication information to the node device. The node device sends, in the second cell, third data to the terminal device based on the first indication information. Therefore, in the embodiments, the terminal device may trigger, by using the indication information, the node device to send, in the second cell, the data to the terminal device, so that the node device can send the data in both the first cell and the second cell. This improves the robustness of the data transmission. In addition, before receiving the first indication information in the second cell, the node device does not send, in the second cell, the third data to the terminal device. This reduces the inter-cell interference and ensures the efficiency of the spectrum resources.

DESCRIPTION OF EMBODIMENTS

The following describes embodiments of this application with reference to the accompanying drawings. It is clear that the described embodiments are merely some but not all of the embodiments of this application. Persons of ordinary skill in the art may learn that as a new technology emerges, the technical solutions provided in the embodiments of this application are also applicable to a similar technical problem.

In the specification, claims, and accompanying drawings of the embodiments of this application, the terms "first", "second", "third", "fourth", and the like (if the terms exist) are intended to distinguish between similar objects but not necessarily intended to indicate a specific order or sequence. It should be understood that data termed in such a way is interchangeable in proper circumstances, so that the embodiments of this application described herein can be implemented in an order other than the order illustrated or described herein. Moreover, the terms "include", "contain" and any other variants thereof are intended to cover nonexclusive inclusion. For example, a process, method, system, product, or device that includes a list of steps or units is not necessarily limited to those steps or units that are expressly listed, but may include other steps or units that are not expressly listed or inherent to the process, method, product, or device.

The embodiments of this application provide a wireless communication method and an apparatus, to improve robustness of data transmission between a terminal device and anode device.

Figure 1:
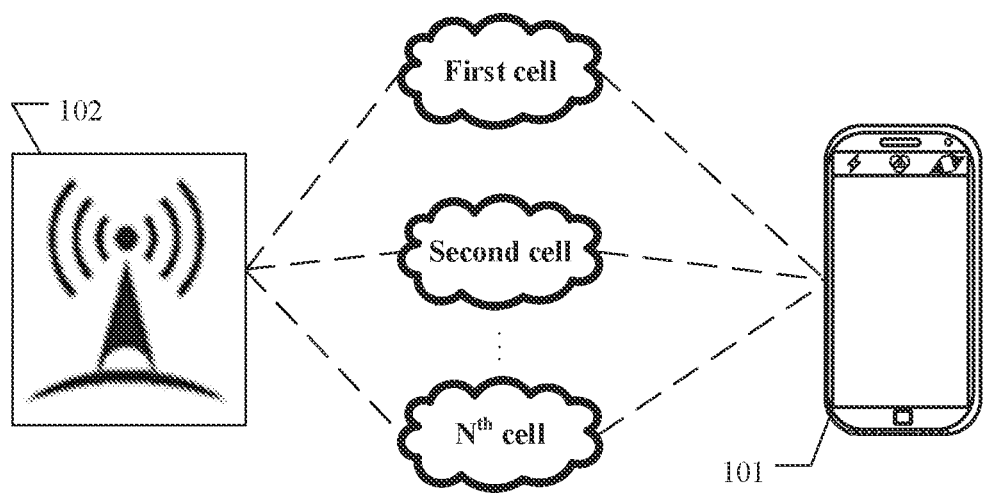
FIG. 1 is a schematic diagram of an application scenario according to an embodiment of this application.

FIG. 1 is a schematic diagram of an application scenario according to an embodiment of this application. As shown in FIG. 1, the schematic diagram of the application scenario includes a terminal device 101 and a node device 102. The node device 102 and the terminal device 101 may communicate with each other in a first cell, a second cell, and an N$^t$h cell. It should be noted that in the embodiments of this application, only an example in which the node device 102 communicates, in the first cell and the second cell, with the terminal device 101 is used to describe the wireless communication method provided in the embodiments of this application.

The node device 102 provided in the embodiments of this application may be a network device configured to communicate with the terminal device 101, or may be a terminal device configured to communicate with the terminal device 101. In the embodiments of this application, only an example in which the node device 102 is used as a network device is used to describe the wireless communication method provided in the embodiments of this application.

Figure 2:
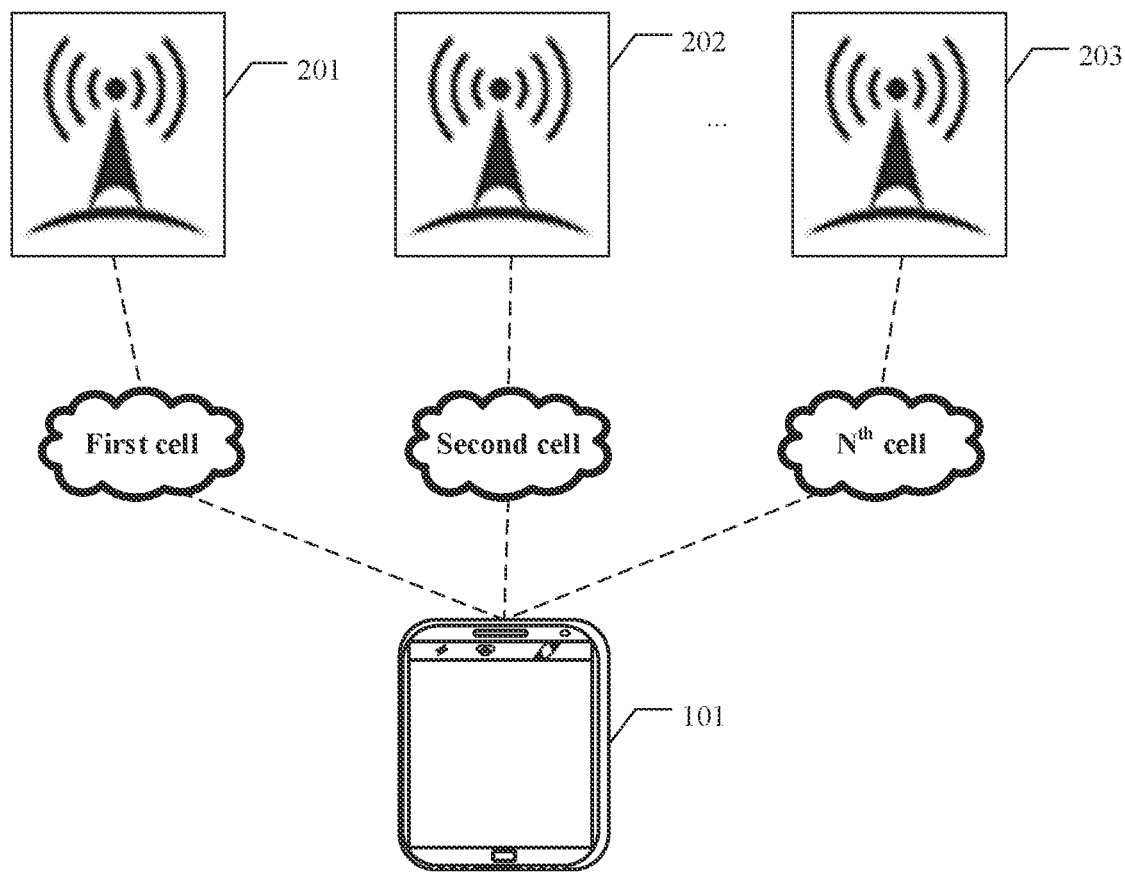
FIG. 2 is a schematic diagram of another application scenario according to an embodiment of this application.

FIG. 2 is a schematic diagram of another application scenario according to an embodiment of this application. As shown in FIG. 2, the schematic diagram of the application scenario includes a terminal device 101, a first node device 201, a second node device 202, and an N$^{th}$ node device 203. The first node device 201 may communicate, in a first cell, with the terminal device 101, the second node device 202 may communicate, in a second cell, with the terminal device 101, and the N$^{th}$ node device 203 may communicate, in an N$^{th}$ cell, with the terminal device 101. It should be noted that in the embodiments of this application, only an example in which the terminal device 101 communicates, in the first cell, with the first node device 201 and communicates, in the second cell, with the second node device 202 is used to describe the wireless communication method provided in the embodiments of this application.

In the embodiments of this application, the first node device 201 and the second node device 202 that correspond to FIG. 2 may be network devices configured to communicate with the terminal device 101. Alternatively, the first node device 201 may be used as a network device, and the second node device 202 may be used as a terminal device. Alternatively, the first node device 201 may be used as a terminal device, and the second node device 202 may be used as a network device. Alternatively, the first node device 201 may be used as a terminal device, and the second node device 202 may be used as a terminal device. In the embodiments of this application, only an example in which the first node device 201 and the second node device 202 are network devices is used to describe the wireless communication method provided in the embodiments of this application.

The terminal device 101 corresponding to FIG. 1 and FIG. 2 in the embodiments of this application may be user equipment (UE), an access terminal, a subscriber unit, a user station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future evolved public land mobile network (PLMN), or the like. This is not limited in the embodiments of this application.

In the embodiments of this application, when the node device 102 in FIG. 1 and the first node device 201 and the second node device 202 in FIG. 2 are used as network devices, the network device may be a device configured to communicate with the terminal device 101. The network device may be a base transceiver station (BTS) in a global system for mobile communications (GSM) system or a code division multiple access (CDMA) system, may be a NodeB (NB) in a wideband code division multiple access (WCDMA) system, may be an evolved NodeB (eNB or eNodeB) in an LTE system, may be a gNodeB (gNB) in a 5th generation (5G) network, or may be a radio controller in a cloud radio access network (CRAN) scenario. Alternatively, the network device may be a relay node, an access point, a vehicle-mounted device, a wearable device, a transmission reception point (TRP), a network device in the future evolved PLMN, or the like.

The embodiments of this application may be applied to various communications systems, such as the global system for mobile communications (GSM) system, the code division multiple access (CDMA) system, the wideband code division multiple access system, a general packet radio service (GPRS) system, the long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5th generation (5G) system or a new radio (NR) system.

The foregoing describes the schematic diagrams of the application scenarios provided in the embodiments of this application. The following describes the wireless communication method provided in the embodiments of this application.

Figure 3:
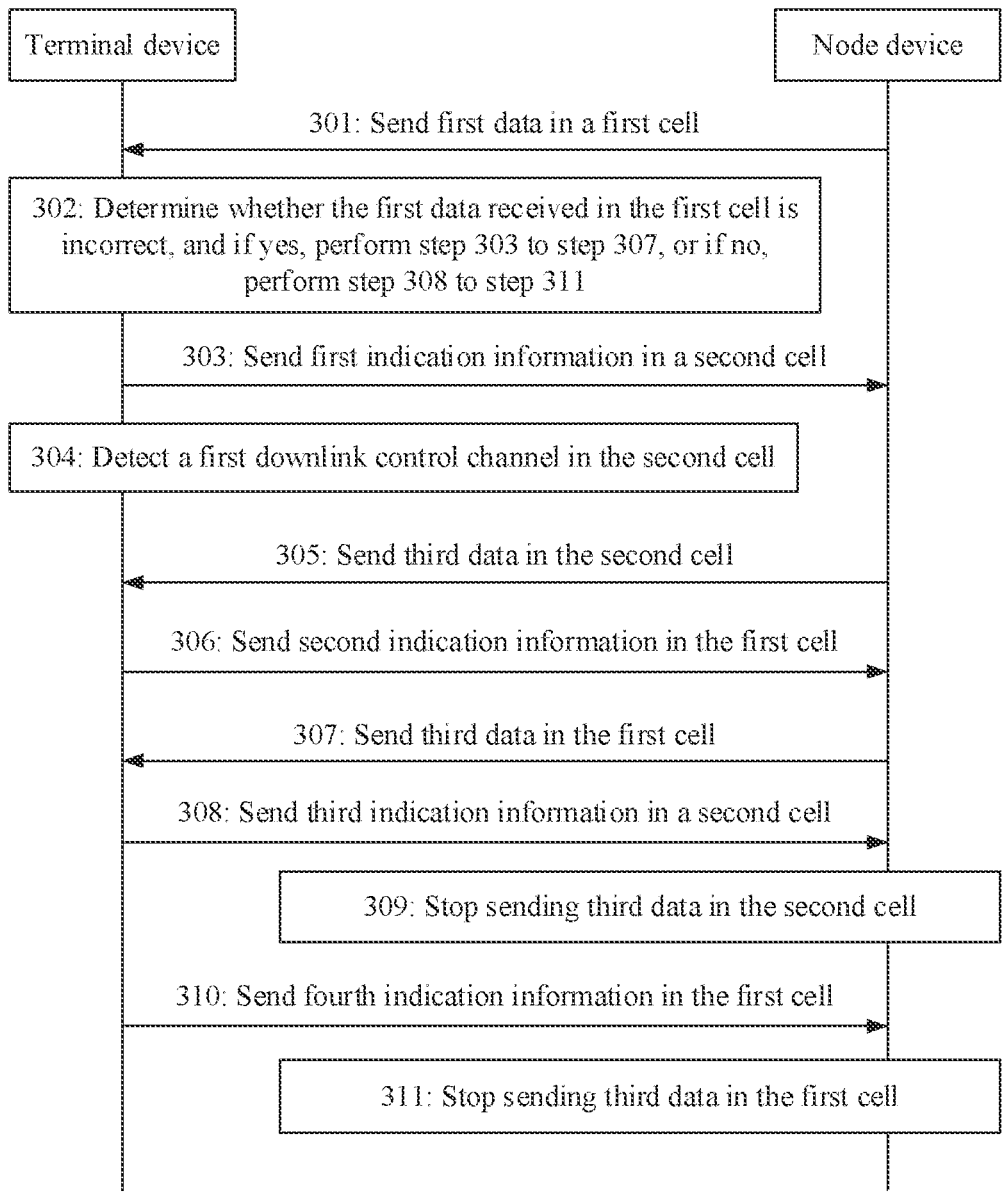
FIG. 3 is a schematic flowchart of a first wireless communication method according to an embodiment of this application.

Based on the application scenario shown in FIG. 1, FIG. 3 is a schematic flowchart of a first wireless communication method according to an embodiment of this application. As shown in FIG. 3, the schematic flowchart may include the following steps.

301: A node device sends, in a first cell, first data to a terminal device.

The node device sends, in the first cell, the first data to the terminal device. The first data may be data initially transmitted in the first cell by the node device to the terminal device, or may be data retransmitted in the first cell by the node device to the terminal device.

It should be noted that when the node device is used as a base station, the first data is downlink data; and when the node device is used as a terminal device, the first data is sidelink data.

In this embodiment, the terminal device performs, in the first cell, radio resource control (RRC) communication with the node device. In other words, the first cell is a first primary cell (PCell). It should be noted that the PCell is a cell in which UE initially establishes a connection, or a cell in which UE reestablishes an RRC connection, or is a cell specified in a handover process. The PCell is responsible for RRC communication with the UE. It may be understood that, the RRC communication performed in the first cell and between the terminal device and the node device may be communication performed after the terminal device establishes, in the first cell, an RRC connection to the node device.

302: The terminal device determines whether the first data received in the first cell is incorrect, and if yes, performs step 303 to step 307, or if no, performs step 308 to step 311.

The terminal device receives the first data in the first cell, and determines whether the first data is incorrectly received. When determining that the first data received in the first cell is incorrect, the terminal device performs step 303 to step 307. When determining that the first data received in the first cell is correct, the terminal device performs step 308 to step 311.

Specifically, the terminal device may determine, based on signal quality of the first data received in the first cell, whether the first data is incorrectly received. For example, when the signal quality of the first data is lower than a first preset threshold, the terminal device determines that the first data is incorrectly received, and therefore performs step 303 to step 307. When the signal quality of the first data is higher than a second preset threshold, the terminal device determines that the first data is correctly received, and performs step 308 to step 311.

It may be understood that, that the first data is incorrectly received in the first cell may alternatively mean that the terminal device has not received the first data in the first cell. This is not limited herein.

303: The terminal device sends, in a second cell, a first indication message to the node device.

The terminal device sends, in the second cell, the first indication information to the node device. The first indication information may be used to indicate that the terminal device incorrectly receives the first data in the first cell, or may be used to request the node device to send, in the second cell, third data to the terminal device.

Optionally, the third data that the node device is requested, by using the first indication information, to send in the second cell may be the first data, in other words, the first indication information may be used to request the node device to jointly transmit the first data in the second cell.

It should be noted that the first indication information in this embodiment and subsequent embodiments may be a negative acknowledgement (negative acknowledgement, NACK), a scheduling request (scheduling request, SR), or other indication information. This is not specifically limited herein.

In this embodiment, communication performed in the second cell and between the terminal device and the node device may be RRC communication, or may not be RRC communication. In other words, the second cell may be a second Pcell, or may be a secondary cell (SCell). It should be noted that the Scell may be added during RRC reconfiguration, to provide an additional radio resource, and there is no RRC communication or RRC connection between the SCell and the UE.

304: The terminal device detects a first downlink control channel in the second cell.

After sending, in the second cell, the first indication information to the node device, the terminal device detects the first downlink control channel in the second cell. The first downlink control channel is a control channel used by the node device to send, in the second cell, the third data to the terminal device.

It may be understood that, in a possible implementation, the terminal device detects first downlink control information in the second cell only after the terminal device sends the first indication information in the second cell. In other words, the terminal device does not detect the first downlink control channel before sending the first indication information. This reduces energy consumed for blindly detecting the control channel by the terminal device, and ensures efficiency of spectrum resources.

305: The node device sends, in the second cell, the third data to the terminal device.

The node device receives, in the second cell, the first indication information sent by the terminal device, and sends, in the second cell, the third data to the terminal device based on the first indication information.

Specifically, the third data sent in the second cell by the node device to the terminal device may be carried on the first downlink control channel. It may be understood that when the third data is carried on the first downlink control channel, the third data is control data carried on the first downlink control channel. The third data sent in the second cell by the node device to the terminal device may alternatively be carried on a downlink shared channel. It may be understood that when the third data is carried on the downlink shared channel, the third data is service data. It should be noted that a parameter used by the terminal device to receive the third data on the downlink shared channel is carried on the first downlink control channel.

Optionally, the third data sent in the second cell may correspond to the first data sent in the first cell. In other words, the third data sent in the second cell by the node device to the terminal device may be the first data.

That the third data sent in the second cell corresponds to the first data sent in the first cell may mean that a transport block (Transport block, TB) corresponding to the third data sent in the second cell by the node device to the terminal device and a TB corresponding to the first data sent in the first cell by the node device are a same first TB.

That the third data sent in the second cell corresponds to the first data sent in the first cell may alternatively mean that the third data sent in the second cell by the node device to the terminal device and the first data sent in the first cell by the node device correspond to a same hybrid automatic repeat request (HARQ) process, so that the terminal device may determine, based on the same HARQ process, that the first data and the third data correspond to a same first TB, and combine the third data sent in the second cell by the node device to the terminal device and the first data sent in the first cell by the node device, to improve demodulation performance.

That the third data sent in the second cell corresponds to the first data sent in the first cell may alternatively mean that TBs respectively corresponding to the third data sent in the second cell by the node device to the terminal device and the first data sent in the first cell by the node device are different redundancy versions obtained after channel coding is performed on a first TB. For example, the first data sent in the first cell is basic data of the first TB, and the third data sent in the second cell is first redundant data of the first TB.

That the third data sent in the second cell corresponds to the first data sent in the first cell may alternatively mean that the third data sent in the second cell and the first data sent in the first cell correspond to a same data packet at a media access control (MAC) layer or a packet data convergence protocol (PDCP) layer.

306: The terminal device sends, in the first cell, second indication information to the node device.

The terminal device sends, in the first cell, the second indication information to the node device. The second indication information may be used to indicate that the terminal device incorrectly receives the first data in the first cell, or may be used to request the node device to send, in the first cell, third data to the terminal device.

Optionally, the third data that the node device is requested, by using the second indication information, to send in the first cell to the terminal device may be the first data, in other words, the second indication information is used to request the node device to retransmit the first data in the first cell.

The second indication information in this embodiment and the subsequent embodiments may be a negative acknowledgement (NACK), a scheduling request (SR), or other indication information. This is not specifically limited herein.

307: The node device sends, in the first cell, the third data to the terminal device.

The node device receives, in the first cell, the second indication information sent by the terminal device, and sends, in the first cell, the third data to the terminal device based on the second indication information.

TBs respectively corresponding to the third data sent in the first cell and the third data sent in the second cell may be different redundancy versions obtained after channel coding is performed on a second TB. For example, the third data sent in the first cell is basic data of the second TB, and the third data sent in the second cell may be redundant data of the second TB.

Optionally, the third data sent in the first cell may correspond to the first data sent in the first cell. In other words, the third data sent in the first cell by the node device to the terminal device may be the first data. That the third data sent in the first cell corresponds to the first data sent in the first cell may mean that the third data sent in the first cell by the node device to the terminal device and the first data sent in the first cell by the node device correspond to the same first TB.

That the third data sent in the first cell corresponds to the first data sent in the first cell may alternatively mean that the third data sent in the first cell by the node device to the terminal device and the first data sent in the first cell by the node device correspond to a same HARQ process, so that the terminal device determines, based on the same HARQ process, that the first data and the third data correspond to the same first TB, and combines the third data sent in the first cell by the node device to the terminal device and the first data sent in the first cell by the node device, to improve demodulation performance.

That the third data sent in the first cell corresponds to the first data sent in the first cell may alternatively mean that TBs respectively corresponding to the third data sent in the first cell and the first data sent in the first cell are different redundancy versions obtained after channel coding is performed on the first TB. For example, the first data sent in the first cell is the basic data of the first TB, and the third data sent in the first cell is second redundant data of the first TB. The second redundant data may be the same as or different from the first redundant data. This is not limited in this embodiment.

That the third data sent in the first cell corresponds to the first data sent in the first cell may alternatively mean that the third data sent in the first cell and the first data sent in the first cell correspond to a same data packet at the media access control (media access control, MAC) layer or the packet data convergence protocol (packet data convergence protocol, PDCP) layer.

It should be noted that, in this embodiment, step 306 and step 307 are optional steps, in other words, step 306 and step 307 may be performed or may not be performed. In this embodiment, step 303 to step 305 may be first performed, and then step 306 and step 307 are performed. Alternatively, step 306 and step 307 may be first performed, and then step 303 to step 305 are performed. Alternatively, step 306 and step 307 may be simultaneously performed with step 303 to step 305.

308: The terminal device sends, in a second cell, third indication information to the node device.

The terminal device sends, in the second cell, the third indication information to the node device. The third indication information may be used to indicate that the terminal device correctly receives the first data in the first cell, or may be used to request the node device to stop sending, in the second cell, third data to the terminal device.

Specifically, the terminal device requests, by using the third indication information, the node device to stop sending, in the second cell, the third data to the terminal device, and may send the third indication information to the node device based on the signal quality of the first data received in the first cell. For example, when the signal quality of the first data is higher than the second preset threshold, the terminal device sends, in the second cell, the third indication information to the node device.

Optionally, that the third indication information is used to request the node device to stop sending, in the second cell, third data to the terminal device may alternatively mean that the third indication information is used to request the node device to stop sending, in the second cell, the first data to the terminal device.

The third indication information in this embodiment and the subsequent embodiments may be a positive acknowledgement (ACK) or other indication information. This is not specifically limited herein.

It should be noted that step 308 is an optional step. To be specific, when determining that the first data is correctly received, the terminal device may send, in the second cell, the third indication information to the node device, or may not send, in the second cell, the third indication information to the node device.

309: The node device stops sending, in the second cell, the third data to the terminal device.

In this embodiment, in one of the following manners, the node device may stop sending, in the second cell, the third data to the terminal device.

Manner 1: The node device receives, in the second cell, the third indication information sent by the terminal device, and stops, based on the third indication information, sending of the third data in the second cell to the terminal device. The stopping sending, in the second cell, the third data to the terminal device may mean that the node device does not send, in the second cell, the third data to the terminal device. For example, one of the following cases may occur:

Case 1-1: Before receiving the third indication information, the node device has not sent, in the second cell, the third data to the terminal device. After receiving the third indication information, the node device does not send, in the second cell, the third data to the terminal device either.

Case 1-2: Before receiving the third indication information, the node device has sent, in the second cell, the third data to the terminal device. After receiving the third indication information, the node device does not send, in the second cell, the third data to the terminal device.

Case 1-3: Before receiving the third indication information, the node device is sending, in the second cell, the third data to the terminal device. After receiving the third indication information, the node device does not send, in the second cell, the third data to the terminal device.

Manner 2: If not receiving, in the second cell before a first moment, first indication information sent by the terminal device, the node device determines that the terminal device correctly receives the first data in the first cell; and may stop, at the first moment, sending of the third data in the second cell to the terminal device. The first moment may be predefined or configured. The stopping sending, in the second cell, the third data to the terminal device means that the node device does not send, in the second cell, the third data to the terminal device. For example, one of the following cases may occur:

Case 2-1: Before the first moment, the node device has not sent, in the second cell, the third data to the terminal device. After the first moment, the node device does not send, in the second cell, the third data to the terminal device either.

Case 2-2: Before the first moment, the node device has sent, in the second cell, the third data to the terminal device. After the first moment, the node device does not send, in the second cell, the third data to the terminal device.

Case 2-3: Before the first moment, the node device is sending, in the second cell, the third data to the terminal device. After the first moment, the node device does not send, in the second cell, the third data to the terminal device.

In the foregoing two manners, optionally, the third data that the node device stops sending in the second cell to the terminal device may be the first data, in other words, the node device may stop, based on the third indication information, sending of the first data in the second cell to the terminal device.

310: The terminal device sends, in the first cell, fourth indication information to the node device.

The terminal device determines that the first data is correctly received, and sends, in the first cell, the fourth indication information to the node device. The fourth indication information may be used to indicate that the terminal device correctly receives the first data in the first cell, or may be used to request the node device to stop sending, in the first cell, third data to the terminal device.

Optionally, that the fourth indication information is used to request the node device to stop sending, in the first cell, third data to the terminal device may alternatively mean that the fourth indication information is used to request the node device to stop sending, in the first cell, the first data to the terminal device.

The fourth indication information in this embodiment and the subsequent embodiments may be an ACK or other indication information. This is not specifically limited herein.

311: The node device stops sending the third data in the first cell.

The node device receives, in the first cell, the fourth indication information of the terminal device, and stops, based on the fourth indication information, sending of the third data in the first cell to the terminal device. That the node device stops sending, in the first cell, the third data to the terminal device may mean that the node device does not send, in the first cell, the third data to the terminal device. For example, one of the following cases may occur:

Case 3-1: Before receiving the fourth indication information, the node device has not sent, in the first cell, the third data to the terminal device. After receiving the fourth indication information, the node device does not send, in the first cell, the third data to the terminal device either.

Case 3-2: Before receiving the fourth indication information, the node device has sent, in the first cell, the third data to the terminal device. After receiving the fourth indication information, the node device does not send, in the first cell, the third data to the terminal device.

Case 3-3: Before receiving the fourth indication information, the node device is sending, in the first cell, the third data to the terminal device. After receiving the fourth indication information, the node device does not send, in the first cell, the third data to the terminal device.

Optionally, the third data that the node device stops, based on the fourth indication information, sending in the first cell to the terminal device may alternatively be the first data, in other words, the node device may stop, based on the fourth indication information, sending of the first data in the first cell to the terminal device.

In this embodiment, step 308 to step 311 are optional steps. During actual application, when determining that the first data is correctly received in the first cell, the terminal device performs step 308 to step 311. In this embodiment, step 308 and step 309 may be first performed, and then step 310 and step 311 may be first performed. Alternatively, step 310 and step 311 may be first performed, and then step 308 and step 309 are performed. Alternatively, step 308 and step 309 may be simultaneously performed with step 310 and step 311. This is not limited herein.

In this embodiment, at least two cells are configured on a node device side. The node device sends, in the first cell, the first data to the terminal device. When incorrectly receiving the first data in the first cell, the terminal device sends the first indication information to the node device. The node device sends, in the second cell, the third data to the terminal device based on the first indication information. Therefore, in this embodiment, the terminal device may trigger, by using the indication information, the node device to send, in the second cell, the data to the terminal device, so that the node device can send the data in both the first cell and the second cell. This improves robustness of data transmission. In addition, before receiving the first indication information in the second cell, the node device does not send, in the second cell, the third data to the terminal device. This reduces inter-cell interference and ensures the efficiency of the spectrum resources.

The foregoing describes the first wireless communication method provided in the embodiments of this application. The following describes another wireless communication method provided in the embodiments of this application.

Figure 4:
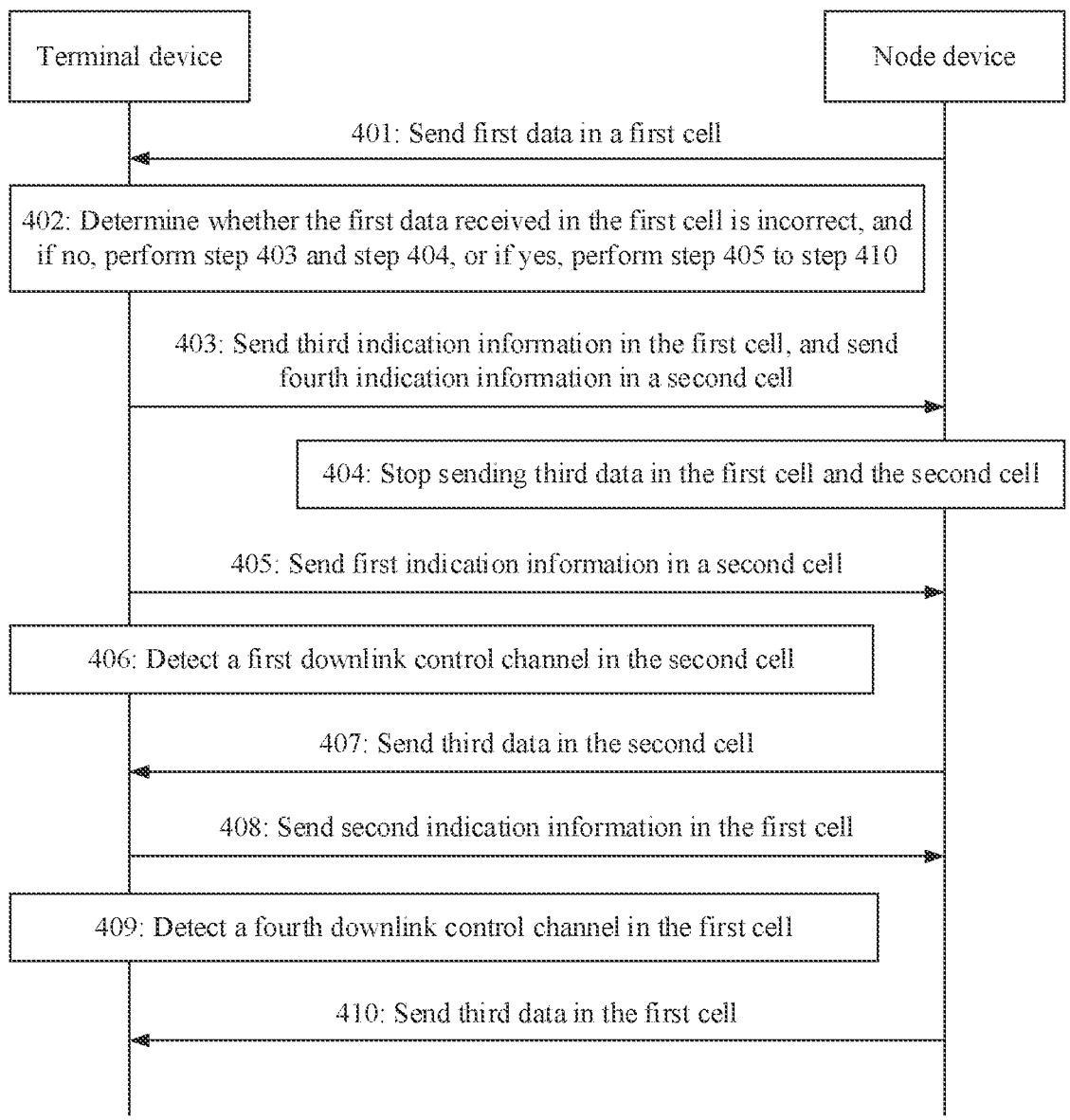
FIG. 4 is a schematic flowchart of a second wireless communication method according to an embodiment of this application.

Based on the application scenario shown in FIG. 1, FIG. 4 is a schematic flowchart of a second wireless communication method according to an embodiment of this application. As shown in FIG. 4, the schematic flowchart may include the following steps.

401: A node device sends, in a first cell, first data to a terminal device.

Step 401 in this embodiment is similar to step 301 corresponding to FIG. 3. For details, refer to step 301 in FIG. 3. The details are not described herein again.

402: The terminal device determines whether the first data is incorrectly received in the first cell, and if no, performs step 403 and step 404, or if yes, performs step 405 to step 410.

Step 402 in this embodiment is similar to step 302 corresponding to FIG. 3. For details, refer to step 302 in FIG. 3. The details are not described herein again.

403: The terminal device sends, in a second cell, third indication information to the node device, and sends, in the first cell, fourth indication information to the node device.

The terminal device sends, in the second cell, the third indication information to the node device, and sends, in the first cell, the fourth indication information to the node device. The third indication information may be used to indicate that the terminal device correctly receives the first data in the first cell, or may be used to request the node device to stop sending, in the second cell, third data to the terminal device. The fourth indication information may be used to indicate that the terminal device correctly receives the first data in the first cell, or may be used to request the node device to stop sending, in the first cell, third data to the terminal device.

Optionally, that the third indication information is used to request the node device to stop sending, in the second cell, third data to the terminal device may alternatively mean that the third indication information is used to request the node device to stop sending, in the second cell, the first data to the terminal device. That the fourth indication information is used to request the node device to stop sending, in the first cell, third data to the terminal device may alternatively mean that the fourth indication information is used to request the node device to stop sending, in the first cell, the first data to the terminal device.

In this embodiment, communication performed in the second cell and between the terminal device and the node device may be RRC communication, or may not be RRC communication. In other words, the second cell may be a second Pcell, or may be a secondary cell (SCell). It should be noted that the Scell may be added during RRC reconfiguration, to provide an additional radio resource, and there is no RRC communication or RRC connection between the SCell and UE.

404: The node device stops sending, in both the first cell and the second cell, the third data to the terminal device.

The node device receives, in the second cell, the third indication information sent by the terminal device, and stops, based on the third indication information, sending of the third data in the second cell to the terminal device. The stopping sending, in the second cell, the third data to the terminal device may mean that the node device does not send, in the second cell, the third data to the terminal device. For example, one of the following cases may occur:

Case 4-1: Before receiving the third indication information, the node device has not sent, in the second cell, the third data to the terminal device. After receiving the third indication information, the node device does not send, in the second cell, the third data to the terminal device either.

Case 4-2: Before receiving the third indication information, the node device has sent, in the second cell, the third data to the terminal device. After receiving the third indication information, the node device does not send, in the second cell, the third data to the terminal device.

Case 4-3: Before receiving the third indication information, the node device is sending, in the second cell, the third data to the terminal device. After receiving the third indication information, the node device does not send, in the second cell, the third data to the terminal device.

Optionally, the third data that the node device stops, based on the third indication information, sending in the second cell to the terminal device may be the first data, in other words, the node device may stop, based on the third indication information, sending of the first data in the second cell to the terminal device.

The node device receives, in the first cell, the fourth indication information of the terminal device, and stops, based on the fourth indication information, sending of the third data in the first cell to the terminal device. In this embodiment, that the node device stops sending, in the first cell, the third data to the terminal device is similar to that the node device stops sending, in the first cell, the third data to the terminal device in step 311 corresponding to FIG. 3. Details are not described herein again.

Optionally, the third data that the node device stops, based on the fourth indication information, sending in the first cell to the terminal device may alternatively be the first data, in other words, the node device may stop, based on the fourth indication information, sending of the first data in the first cell to the terminal device.

405: The terminal device sends, in the second cell, a first indication message to the node device.

The terminal device sends, in the second cell, the first indication information to the node device. The first indication information may be used to indicate that the terminal device incorrectly receives the first data in the first cell, or may be used to request the node device to send, in the second cell, third data to the terminal device.

Optionally, the third data that the node device is requested, by using the first indication information, to send in the second cell may be the first data, in other words, the first indication information may be used to request the node device to jointly transmit the first data in the second cell.

It should be noted that step 405 is an optional step. To be specific, when determining that the first data is incorrectly received, the terminal device may send, in the second cell, the first indication information to the node device, or may not send, in the second cell, the first indication information to the node device.

406: The terminal device detects a first downlink control channel in the second cell.

After determining that the first data is incorrectly received, the terminal device detects the first downlink control channel in the second cell. The first downlink control channel is a control channel used by the node device to send, in the second cell, the third data to the terminal device.

It may be understood that, in a possible implementation, the terminal device detects first downlink control information in the second cell only after the terminal device determines that the first data is incorrectly received. In other words, the terminal device does not detect the first downlink control channel before receiving the first data in the first cell. This reduces energy consumed for blindly detecting the control channel by the terminal device, and ensures efficiency of spectrum resources.

407: The node device sends, in the second cell, the third data to the terminal device.

In this embodiment, the node device may send, in the second cell, the third data to the terminal device in one of the following manners.

Manner 1: If not receiving, in the second cell before a second moment, third indication information sent by the terminal device, the node device determines that the terminal device incorrectly receives the first data in the first cell; and sends, in the second cell, the third data to the terminal device at the second moment. The second moment may be predefined or configured.

Manner 2: When receiving, in the second cell, the first indication information sent by the terminal device, the node device determines, based on the first indication information, that the terminal device incorrectly receives the first data; and sends, in the second cell, the third data to the terminal device.

In the foregoing two manners, specifically, the third data sent in the second cell by the node device to the terminal device may be carried on the first downlink control channel. It may be understood that when the third data is carried on the first downlink control channel, the third data is control data on the first downlink control channel. The third data sent in the second cell by the node device to the terminal device may alternatively be carried on a downlink shared channel. It may be understood that when the third data is carried on the downlink shared channel, the third data is service data. It should be noted that a parameter used by the terminal device to receive the third data on the downlink shared channel is carried on the first downlink control channel.

In the foregoing two manners, optionally, the third data sent in the second cell may correspond to the first data sent in the first cell. In other words, the third data sent in the second cell by the node device to the terminal device may be the first data.

That the third data sent in the second cell may correspond to the first data sent in the first cell in step 407 is similar to that the third data sent in the second cell may correspond to the first data sent in the first cell in step 305 in the embodiment corresponding to FIG. 3. Details are not described herein again, and for the details, refer to step 305.

408: The terminal device sends, in the first cell, second indication information to the node device.

The terminal device sends, in the first cell, the second indication information to the node device. The second indication information may be used to indicate that the terminal device incorrectly receives the first data in the first cell, or may be used to request the node device to send, in the first cell, third data to the terminal device.

Optionally, the third data that the node device is requested, by using the second indication information, to send in the first cell to the terminal device may be the first data, in other words, the second indication information is used to request the node device to retransmit the first data in the first cell.

409: The terminal device detects a fourth downlink control channel in the first cell.

After sending, in the first cell, the second indication information to the node device, the terminal device detects the fourth downlink control channel in the first cell. The fourth downlink control channel is a control channel used by the node device to send, in the first cell, the third data to the terminal device.

410: The node device sends, in the first cell, the third data to the terminal device.

The node device receives, in the first cell, the second indication information sent by the terminal device, and sends, in the first cell, the third data to the terminal device based on the second indication information. TBs respectively corresponding to the third data sent in the first cell and the third data sent in the second cell may be different redundancy versions obtained after channel coding is performed on a second TB. For example, the third data sent in the first cell is basic data of the second TB, and the third data sent in the second cell may be redundant data of the second TB.

Optionally, the third data sent in the first cell may correspond to the first data sent in the first cell. In other words, the third data sent in the first cell is the first data. It should be noted that, that the third data sent in the first cell may correspond to the first data sent in the first cell in step 410 is similar to that the third data sent in the first cell may correspond to the first data sent in the first cell in step 307 in the embodiment corresponding to FIG. 3. Details are not described herein again, and for the details, refer to step 307.

In this embodiment, step 405 to step 410 are optional steps. During actual application, when determining that the first data is incorrectly received in the first cell, the terminal device performs step 405 to step 410. In this embodiment, step 405 to step 407 may be first performed, and then step 408 to step 410 are performed. Alternatively, step 408 to step 410 may be first performed, and then step 405 to step 407 are performed. Alternatively, step 405 to step 407 may be simultaneously performed with step 408 to step 410. This is not limited herein.

In this embodiment, at least two cells are configured on a node device side. The node device sends, in the first cell, the first data to the terminal device. If not receiving the third indication information in the second cell before the second preconfigured moment, or receiving the first indication information in the second cell, the node device sends, in the second cell, the first data to the terminal device. Therefore, in this embodiment, the node device is triggered by using the first indication information sent by the terminal device, or is triggered at the second preconfigured moment preconfigured by the node device, to send the third data in the second cell, so that the node device can send the data in both the first cell and the second cell. This improves robustness of data transmission. In addition, before the node device receives the first indication information in the second cell or before the second preconfigured moment, the node device does not send, in the second cell, the first data to the terminal device. This reduces inter-cell interference and ensures the efficiency of the spectrum resources.

The foregoing describes the second wireless communication method provided in the embodiments of this application. The following describes another wireless communication method provided in the embodiments of this application.

Figure 5:
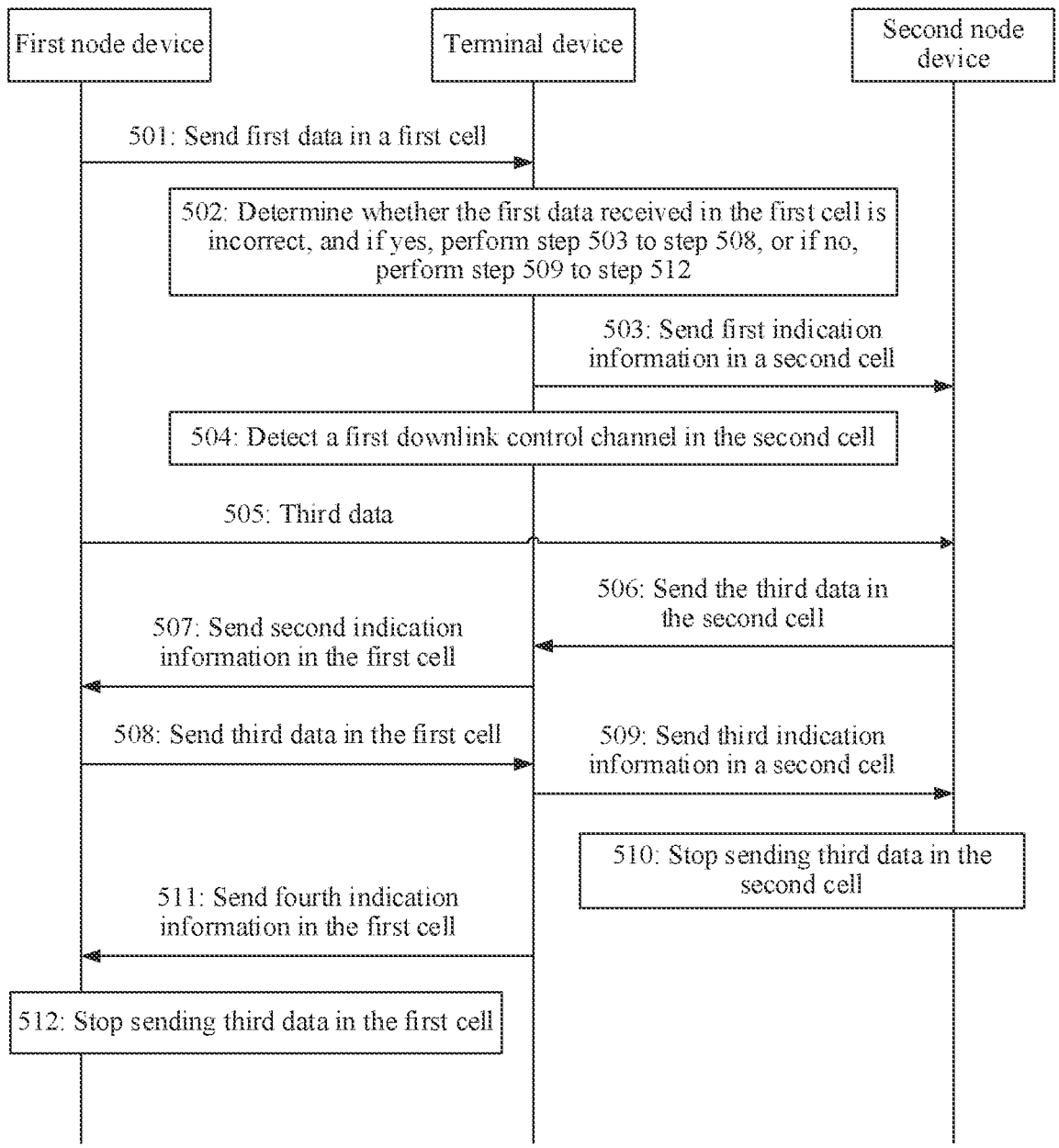
FIG. 5 is a schematic flowchart of a third wireless communication method according to an embodiment of this application.

Based on the application scenario shown in FIG. 2, FIG. 5 is a schematic flowchart of a third wireless communication method according to an embodiment of this application. As shown in FIG. 5, the schematic flowchart may include the following steps.

501: A first node device sends, in a first cell, first data to a terminal device.

The action performed by the first node device in step 501 is similar to the action performed by the node device in step 301 corresponding to FIG. 3. For details, refer to step 301 in FIG. 3. The details are not described herein again.

502: The terminal device determines whether the first data is incorrectly received in the first cell, and if yes, performs step 503 to step 508, or if no, performs step 509 to step 512.

Step 502 in this embodiment is similar to step 302 corresponding to FIG. 3. For details, refer to step 302 in FIG. 3. The details are not described herein again.

503: The terminal device sends, in a second cell, first indication information to a second node device.

The terminal device sends, in the second cell, the first indication information to the second node device. The first indication information may be used to indicate that the terminal device incorrectly receives the first data in the first cell, or may be used to request the second node device to send, in the second cell, third data to the terminal device.

Optionally, the third data that the second node device is requested, by using the first indication information, to send in the second cell may be the first data, in other words, the first indication information may be used to request the second node device to jointly transmit the first data in the second cell.

In this embodiment, communication performed in the second cell and between the terminal device and the second node device may be RRC communication, or may not be RRC communication. In other words, the second cell may be a second Pcell, or may be an SCell. It should be noted that the Scell may be added during RRC reconfiguration, to provide an additional radio resource, and there is no RRC communication or RRC connection between the SCell and UE.

504: The terminal device detects a first downlink control channel in the second cell.

After sending, in the second cell, the first indication information to the second node device, the terminal device detects the first downlink control channel in the second cell. The first downlink control channel is a control channel used by the second node device to send, in the second cell, the third data to the terminal device.

It may be understood that, in a possible implementation, the terminal device detects first downlink control information in the second cell only after the terminal device sends the first indication information in the second cell. In other words, the terminal device does not detect the first downlink control channel before sending the first indication information. This reduces energy consumed for blindly detecting the control channel by the terminal device, and ensures efficiency of spectrum resources.

505: The first node device sends the third data to the second node device.

The first node device may send the third data to the second node device by using an air interface message. The third data is data sent in the first cell by the first node device to the terminal device. It may be understood that the first node device may alternatively send the third data to the second node device in another manner, for example, may send the third data to the second node device through a wired connection or an optical fiber connection. This is not limited herein.

It should be noted that the first node device may simultaneously send the third data to the second node device when sending, in the first cell, the first data to the terminal device. Alternatively, the first node device may send the third data to the second node device before the second node device sends, in the second cell, the first data to the node device. Alternatively, the first node device may send the third data to the second node device after the second node device sends, in the second cell, the first data to the node device. This is not limited herein.

Optionally, the third data sent by the first node device to the second node device may be the first data.

In this embodiment, step 505 is an optional step. When a data backhaul between the first node device and the second node device is a non-ideal backhaul, the first node device performs step 505.

506: The second node device sends, in the second cell, the third data to the terminal device.

In this embodiment, the action performed by the second node device in step 506 is similar to the action performed by the node device in step 305 corresponding to FIG. 3. Details are not described herein again.

507: The terminal device sends, in the first cell, second indication information to the first node device.

The terminal device sends, in the first cell, the second indication information to the first node device. The second indication information may be used to indicate that the terminal device incorrectly receives the first data in the first cell, or may be used to request the first node device to send, in the first cell, third data to the terminal device.

Optionally, the third data that the first node device is requested, by using the second indication information, to send in the first cell to the terminal device may be the first data, in other words, the second indication information is used to request the first node device to retransmit the first data in the first cell.

508: The first node device sends, in the first cell, the third data to the terminal device.

The action performed by the first node device in step 508 is similar to the action performed by the node device in step 307 corresponding to FIG. 3. For details, refer to step 307 in FIG. 3. The details are not described herein again.

It should be noted that, during actual application, step 507 and step 508 are optional steps, in other words, step 507 and step 508 may be performed or may not be performed. In this embodiment, step 503 to step 506 may be first performed, and then step 507 and step 508 are performed. Alternatively, step 507 and step 508 may be first performed, and then step 503 to step 506 are performed. Alternatively, step 503 to step 506 may be simultaneously performed with step 507 and step 508. This is not limited herein.

509: The terminal device sends, in the second cell, third indication information to the second node device.

The action performed by the second node device in step 509 is similar to the action performed by the node device in step 308 corresponding to FIG. 3. For details, refer to step 308 in FIG. 3. The details are not described herein again.

It should be noted that step 509 is an optional step. To be specific, after determining that the first data is correctly received, the terminal device may send, in the second cell, the third indication information to the second node device, or may not send, in the second cell, the third indication information to the second node device.

510: The second node device stops sending, in the second cell, third data to the terminal device.

The action performed by the second node device in step 510 is similar to the action performed by the node device in step 309 corresponding to FIG. 3. For details, refer to step 309 in FIG. 3. The details are not described herein again.

511: The terminal device sends, in the first cell, fourth indication information to the first node device.

The terminal device determines that the first data is correctly received, and sends, in the first cell, the fourth indication information to the node device. The fourth indication information may be used to indicate that the terminal device correctly receives the first data in the first cell, or may be used to request the node device to stop sending, in the first cell, third data to the terminal device.

Optionally, that the fourth indication information is used to request the node device to stop sending, in the first cell, third data to the terminal device may alternatively mean that the fourth indication information is used to request the node device to stop sending, in the first cell, the first data to the terminal device.

512: The first node device stops sending, in the first cell, the third data to the terminal device.

The action performed by the first node device in step 512 is similar to the action performed by the node device in step 311 corresponding to FIG. 3. For details, refer to step 311 in FIG. 3. The details are not described herein again.

In this embodiment, step 509 to step 512 are optional steps. During actual application, when determining that the first data is correctly received in the first cell, the terminal device performs step 509 to step 512. In this embodiment, step 509 and step 510 may be first performed, and then step 511 and step 512 are performed. Alternatively, step 511 and step 512 may be first performed, and then step 509 and step 510 are performed. Alternatively, step 509 and step 510 may be simultaneously performed with step 511 and step 512. This is not limited herein.

In this embodiment, the terminal device is associated with at least two node devices. The first node device sends, in the first cell, the first data to the terminal device. When incorrectly receiving the first data in the first cell, the terminal device sends the first indication information to the second node device. The second node device sends, in the second cell, the third data to the terminal device based on the first indication information. Therefore, in this embodiment, the terminal device may trigger, by using the indication information, the second node device to send, in the second cell, the third data to the terminal device, so that the terminal device can receive the data through the first node device and the second node device. This improves robustness of data transmission. In addition, before receiving the first indication information in the second cell, the second node device does not send, in the second cell, the third data to the terminal device. This reduces inter-cell interference and ensures the efficiency of the spectrum resources.

The foregoing describes the third wireless communication method provided in the embodiments of this application. The following describes another wireless communication method provided in the embodiments of this application.

Figure 6:
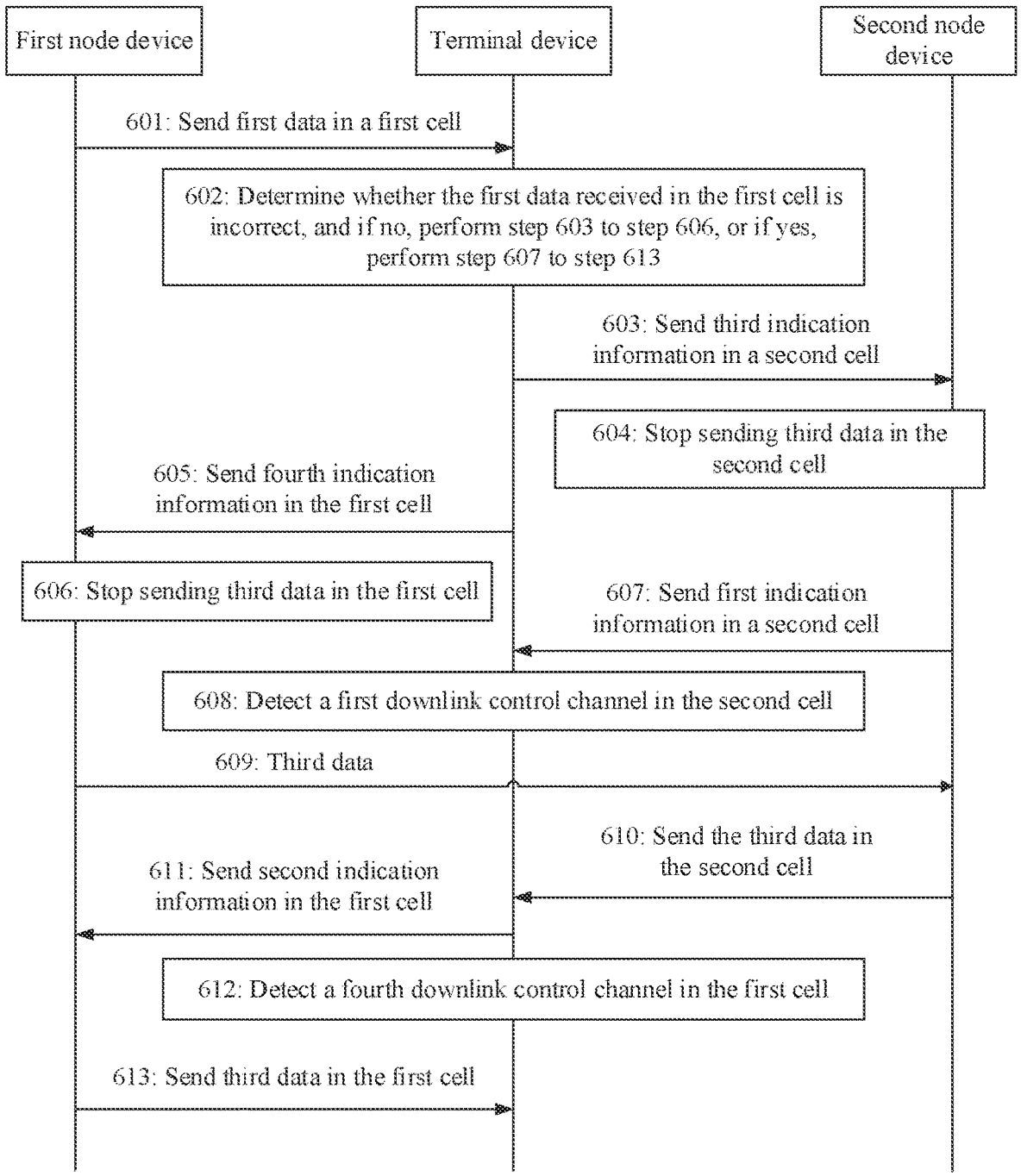
FIG. 6 is a schematic flowchart of a fourth wireless communication method according to an embodiment of this application.

Based on the application scenario shown in FIG. 2, FIG. 6 is a schematic flowchart of a fourth wireless communication method according to an embodiment of this application. As shown in FIG. 6, the schematic flowchart may include the following steps.

601: A first node device sends, in a first cell, first data to a terminal device.

The action performed by the first node device in step 601 is similar to the action performed by the node device in step 301 corresponding to FIG. 3. For details, refer to step 301 in FIG. 3. The details are not described herein again.

602: The terminal device determines whether the first data is incorrectly received in the first cell, and if no, performs step 603 to step 606, or if yes, performs step 607 to step 613.

Step 602 in this embodiment is similar to step 302 corresponding to FIG. 3. For details, refer to step 302 in FIG. 3. The details are not described herein again.

603: The terminal device sends, in a second cell, third indication information to a second node device.

The terminal device sends, in the second cell, the third indication information to the second node device. The third indication information may be used to indicate that the terminal device correctly receives the first data in the first cell, or may be used to request the second node device to stop sending, in the second cell, third data to the terminal device.

Optionally, that the third indication information is used to request the second node device to stop sending, in the second cell, third data to the terminal device may alternatively mean that the third indication information is used to request the second node device to stop sending, in the second cell, the first data to the terminal device.

In this embodiment, communication performed in the second cell and between the terminal device and the node device may be RRC communication, or may not be RRC communication. In other words, the second cell may be a second Pcell, or may be a secondary cell (SCell). It should be noted that the Scell may be added during RRC reconfiguration, to provide an additional radio resource, and there is no RRC communication or RRC connection between the SCell and UE.

604: The second node device stops sending, in the second cell, the third data to the terminal device.

The second node device determines, based on the third indication information, that the terminal device successfully receives the first data in the first cell; and stops sending, in the second cell, the third data to the terminal device. In this embodiment, that the second node device stops sending, in the second cell, the third data to the terminal device is similar to that the node device stops sending, in the second cell, the third data to the terminal device in step 404 corresponding to FIG. 4. Details are not described herein again.

Optionally, the third data that the second node device stops, based on the third indication information, sending in the second cell to the terminal device may be the first data, in other words, the second node device may stop, based on the third indication information, sending of the first data in the second cell to the terminal device.

605. The terminal device sends, in the first cell, fourth indication information to the first node device.

The terminal device sends, in the first cell, the fourth indication information to the first node device. The fourth indication information may be used to indicate that the terminal device correctly receives the first data in the first cell, or may be used to request the first node device to stop sending, in the first cell, third data to the terminal device.

Optionally, that the fourth indication information is used to request the first node device to stop sending, in the first cell, third data to the terminal device may alternatively mean that the fourth indication information is used to request the first node device to stop sending, in the first cell, the first data to the terminal device.

606: The first node device stops sending, in the first cell, the third data to the terminal device.

The second node device determines, based on the fourth indication information, that the terminal device successfully receives the first data in the first cell, and stops sending, in the first cell, the third data to the terminal device. In this embodiment, that the first node device stops sending, in the first cell, the third data to the terminal device is similar to that the node device stops sending, in the first cell, the third data to the terminal device in step 311 corresponding to FIG. 3. Details are not described herein again.

Optionally, the third data that the first node device stops, based on the fourth indication information, sending in the first cell to the terminal device may alternatively be the first data, in other words, the first node device may stop, based on the fourth indication information, sending of the first data in the first cell to the terminal device.

In this embodiment, step 603 and step 604 may be first performed, and then step 605 and step 606 are performed. Alternatively, step 605 and step 606 may be first performed, and then step 603 and step 604 are performed. Alternatively, step 603 and step 604 may be simultaneously performed with step 605 and step 606. This is not limited herein.

607: The terminal device sends, in the second cell, a first indication message to the second node device.

The terminal device sends, in the second cell, the first indication information to the second node device. The first indication information may be used to indicate that the terminal device incorrectly receives the first data in the first cell, or may be used to request the second node device to send, in the second cell, third data to the terminal device.

Optionally, the third data that the second node device is requested, by using the first indication information, to send in the second cell may be the first data, in other words, the first indication information may be used to request the second node device to jointly transmit the first data in the second cell.

It should be noted that step 607 is an optional step. To be specific, when determining that the first data is incorrectly received, the terminal device may send, in the second cell, the first indication information to the second node device, or may not send, in the second cell, the first indication information to the second node device.

608: The terminal device detects a first downlink control channel in the second cell.

After determining that the first data is incorrectly received, the terminal device detects the first downlink control channel in the second cell. The first downlink control channel is a control channel used by the second node device to send, in the second cell, the third data to the terminal device.

It may be understood that, in a possible implementation, the terminal device detects first downlink control information in the second cell only after the terminal device determines that the first data is incorrectly received. In other words, the terminal device does not detect the first downlink control channel before receiving the first data in the first cell. This reduces energy consumed for blindly detecting the control channel by the terminal device, and ensures efficiency of spectrum resources.

609: The first node device sends the third data to the second node device.

Step 609 in this embodiment is similar to step 505 corresponding to FIG. 5. For details, refer to step 505 in FIG. 5. The details are not described herein again.

610: The second node device sends, in the second cell, the third data to the terminal device.

In this embodiment, the second node device may send, in the second cell, the third data to the terminal device in one of the following manners.

Manner 1: If not receiving, in the second cell before a second moment, third indication information sent by the terminal device, the second node device determines that the terminal device incorrectly receives the first data in the first cell; and sends, in the second cell, the third data to the terminal device at the second moment. The second moment may be predefined or configured.

Manner 2. When receiving, in the second cell, the first indication information sent by the terminal device, the second node device may also determine, based on the first indication information, that the terminal device incorrectly receives the first data: and send, in the second cell, the third data to the terminal device.

In the foregoing two manners, specifically, the third data sent in the second cell by the second node device to the terminal device may be carried on the first downlink control channel. It may be understood that when the third data is carried on the first downlink control channel, the third data is control data on the first downlink control channel. The third data sent in the second cell by the second node device to the terminal device may alternatively be carried on a downlink shared channel. It may be understood that when the third data is carried on the downlink shared channel, the third data is service data. It should be noted that a parameter used by the terminal device to receive the third data on the downlink shared channel is carried on the first downlink control channel.

In the foregoing two manners, optionally, the third data sent in the second cell may correspond to the first data sent in the first cell. In other words, the third data sent in the second cell by the second node device to the terminal device may be the first data.

It should be noted that, that the third data sent in the second cell may correspond to the first data sent in the first cell in step 610 is similar to that the third data sent in the second cell may correspond to the first data sent in the first cell in step 305 in the embodiment corresponding to FIG. 3. Details are not described herein again, and for the details, refer to step 305.

611: The terminal device sends, in the first cell, second indication information to the first node device.

The terminal device sends, in the first cell, the second indication information to the first node device. The second indication information may be used to indicate that the terminal device incorrectly receives the first data in the first cell, or may be used to request the first node device to send, in the first cell, third data to the terminal device.

Optionally, the third data that the first node device is requested, by using the second indication information, to send in the first cell to the terminal device may be the first data, in other words, the second indication information is used to request the first node device to retransmit the first data in the first cell.

612: The terminal device detects a fourth downlink control channel in the first cell.

After sending, in the first cell, the second indication information to the first node device, the terminal device detects the fourth downlink control channel in the first cell. The fourth downlink control channel is a control channel used by the first node device to send, in the first cell, the third data to the terminal device.

613: The first node device sends, in the first cell, the third data to the terminal device.

The action performed by the first node device in step 613 is similar to the action performed by the node device in step 410 corresponding to FIG. 4. For details, refer to step 410 in FIG. 4. The details are not described herein again.

In this embodiment, step 607 to step 613 are optional steps. During actual application, when determining that the first data is incorrectly received in the first cell, the terminal device performs step 607 to step 613. In this embodiment, step 607 to step 610 may be first performed, and then step 611 to step 613 are performed. Alternatively, step 611 to step 613 may be first performed, and then step 607 to step 610 are performed. Alternatively, step 607 to step 610 may be simultaneously performed with step 611 to step 613. This is not limited herein.

In this embodiment, the terminal device is associated with at least two node devices. The first node device sends, in the first cell, the first data to the terminal device. If not receiving the fourth indication information in the second cell before the second preconfigured moment, or receiving the first indication information in the second cell, the second node device sends, in the second cell, the first data to the terminal device. Therefore, in this embodiment, the node device is triggered by using the first indication information sent by the terminal device, or is triggered at the second preconfigured moment preconfigured by the second node device, to send the third data in the second cell, so that the terminal device can receive the third data sent by the first node device and the second node device. This improves robustness of data transmission. In addition, before the second node device receives the first indication information in the second cell or before the second preconfigured moment, the second node device does not send, in the second cell, the third data to the terminal device. This reduces inter-cell interference and ensures the efficiency of the spectrum resources.

The foregoing describes the fourth wireless communication method provided in the embodiments of this application. The following describes another wireless communication method provided in the embodiments of this application.

Figure 7:
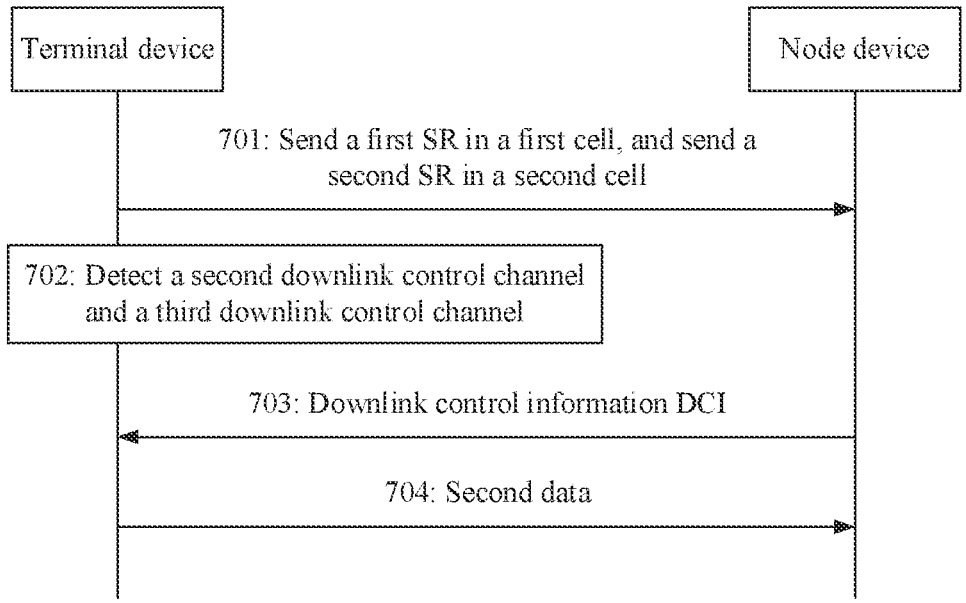
FIG. 7 is a schematic flowchart of a fifth wireless communication method according to an embodiment of this application.

Based on the application scenario shown in FIG. 1, FIG. 7 is a schematic flowchart of a fifth wireless communication method according to an embodiment of this application. As shown in FIG. 7, the schematic flowchart may include the following steps.

701: A terminal device sends, in a first cell, a first scheduling request (SR) to a node device, and sends, in a second cell, a second SR to the node device.

Before sending second data, the terminal device sends, in the first cell, the first SR to the node device, and sends, in the second cell, the second SR to the node device. The first SR is used to request to send the second data to the node device, and the second SR is used to request to send the second data to the node device. It should be noted that, in this embodiment and subsequent embodiments, only an example in which the SR used to request the second data is sent in the first cell and the second cell is used for description, and the SR used to request the second data may alternatively be sent in more cells. This is not limited herein.

It should be noted that when the node device is used as a base station, the second data is uplink data; and when the node device is used as a terminal device, the second data is sidelink data.

In this embodiment, a resource used to carry the first SR corresponds to a resource used to carry the second SR of a first node device. The following describes in detail a correspondence between the resource used to carry the first SR of the first node device and the resource used to carry the second SR of the first node device.

That the resource used to carry the second SR corresponds to the resource used to carry the first SR may mean that there is a predefined or configured relationship between an index of the resource used to carry the second SR and an index of the resource used to carry the first SR. For example, in the first cell, N1 candidate resources that can be used to send the first SR are configured for the terminal device, and indexes X of the N1 candidate resources are 0 to N1−1; and in the second cell, N2 candidate resources that can be used to send the second SR are configured for the terminal, and indexes Y of the N2 candidate resources are 0 to N2−1. When the index X of the resource used to carry the first SR and the index Y of the resource used to carry the second SR satisfy the predefined or configured relationship, for example, satisfy X=Y+K or X=Y−K, it indicates that both the first SR and the second SR are used by the terminal device to request to schedule the second data, and correspondingly, a value of predefined or configured K may be one or more of −N2+1 to N1−1. Alternatively, the index X and the index Y may satisfy X=Y*K, and correspondingly, predefined or configured K may be any positive integer.

That the resource used to carry the second SR corresponds to the resource used to carry the first SR may alternatively mean that there is a predefined or configured relationship between a frequency domain position F1 of the resource used to carry the second SR and a frequency domain position F2 of the resource used to carry the first SR. For example, if F1 and F2 satisfy F1=F2+ΔF or F1=F2−ΔF, and ΔF represents any integer quantity of subcarriers and is predefined or configured, it indicates that both the first SR and the second SR are used by the terminal device to request to schedule the second data. Optionally, the frequency domain position F1 of the resource used to carry the first SR may be a position of a lowest subcarrier, a position of a center subcarrier, or a position of a highest subcarrier of the resource used to carry the first SR, and the frequency domain position F2 of the resource used to carry the second SR may be a position of a lowest subcarrier, a position of a center subcarrier, or a position of a highest subcarrier of the resource used to carry the second SR.

That the resource used to carry the second SR corresponds to the resource used to carry the first SR may alternatively mean that there is a predefined or configured relationship between a time domain offset Offset1 of the resource used to carry the second SR and a time domain offset Offset2 of the resource used to carry the first SR. For example, if Offset1=Offset2+ΔOffset or Offset1=Offset2−ΔOffset, and ΔOffset represents an integer quantity of transmission slots or transmission symbols and is predefined or configured, it indicates that both the first SR and the second SR are used by the terminal device to request to schedule the second data. Specifically, when periodicities of the first SR and the second SR are equal to each other and both are greater than or equal to one slot, a slot $n_{s,f,1}$ in a system frame $n_{f,1}$ in which a transmission occasion (transmission occasion) of the first SR is located satisfies $(n_{f,1}N_{slot}+n_{s,f,1}-\text{Offset1}) \bmod P_1=0$, and a slot $n_{s,f,2}$ in a system frame $n_{f,2}$ in which a transmission occasion (transmission occasion) of the second SR is located satisfies $(n_{f,2}N_{slot}+n_{s,f,2}-\text{Offset2}) \bmod P_2=0$. In this case, it indicates that both the first SR and the second SR are used by the terminal device to request to schedule the second data. Particularly, when $P_1$ and $P_2$ are equal and both are equal to one slot, Offset1 or Offset2 is equal to 0. When $P_1$ and $P_2$ are equal and both are less than one slot, a start transmission symbol $l_1$ of the first SR satisfies $(l_1-\text{Offset1} \bmod P_1) \bmod P_1=0)$, and a start transmission symbol $l_2$ of the second SR satisfies $(l_2-\text{Offset2} \bmod P_1) \bmod P_2=0$. In this case, it indicates that both the first SR and the second SR are used by the terminal device to request to schedule the second data. $N_{slot}$ represents a quantity of slots included in one system frame, $P_1$ is the periodicity of the first SR, and $P_2$ is the periodicity of the second SR.

Optionally, in this embodiment, the terminal device performs, in the first cell, RRC communication with the node device, in other words, the first cell is a first PCell. Alternatively, the terminal device may perform, in the second cell, RRC communication with the node device, in other words, the second cell may be a second PCell. Alternatively, the terminal device may not perform, in the second cell, RRC communication with the node device, in other words, the second cell may be an SCell. It may be understood that, the RRC communication performed between the terminal device and the node device may be communication performed after the terminal device establishes an RRC connection to the node device.

702: The terminal device detects a second downlink control channel and a third downlink control channel.

After sending, in the first cell, the first SR to the node device and sending, in the second cell, the second SR to the node device, the terminal device detects the second downlink control channel in the first cell, and detects the third downlink control channel in the second cell.

The second downlink control channel is a control channel used by the node device to send downlink control information (downlink control information, DCI) in the first cell, and the third downlink control channel is a control channel used by the node device to send DCI in the second cell.

703: The node device sends the DCI to the terminal device.

After receiving the first SR and the second SR, the node device determines, based on the correspondence between the resource used to carry the first SR and the resource used to carry the second SR, that the first SR and the second SR are used to request to send the second data to the node device.

The node device may send the DCI to the terminal device on the second downlink control channel, or may send the DCI to the terminal device on the third downlink control channel, or may send the DCI to the terminal device on both the second downlink control channel and the third downlink control channel. The DCI is used by the terminal device to send the second data to the node device, and the DCI includes a parameter, for example, HARQ information and power control, that is used to transmit the second data.

704: The terminal device sends the second data to the node device.

After receiving the DCI sent by the node device, the terminal device sends, in the first cell, the second data to the node device based on the DCI; or may send, in the second cell, the second data to the node device based on the DCI; or may send, in both the first cell and the second cell, the second data to the node device based on the DCI.

In this embodiment, the terminal device sends, in the first cell, the first SR to the node device, and sends, in the second cell, the second SR to the node device, where the resource used to carry the first SR corresponds to the resource used to carry the second SR, so that the node device may determine, based on the correspondence between the resource used to carry the first SR and the resource used to carry the second SR, that the first SR and the second SR are used to request to send the second data. Therefore, in this embodiment, the terminal device may send, in at least two cells, the SR to the node device, so that robustness of transmitting the SR is improved, thereby improving robustness of transmitting the second data.

The foregoing describes the fifth wireless communication method provided in the embodiments of this application. The following describes another wireless communication method provided in the embodiments of this application.

Figure 8:
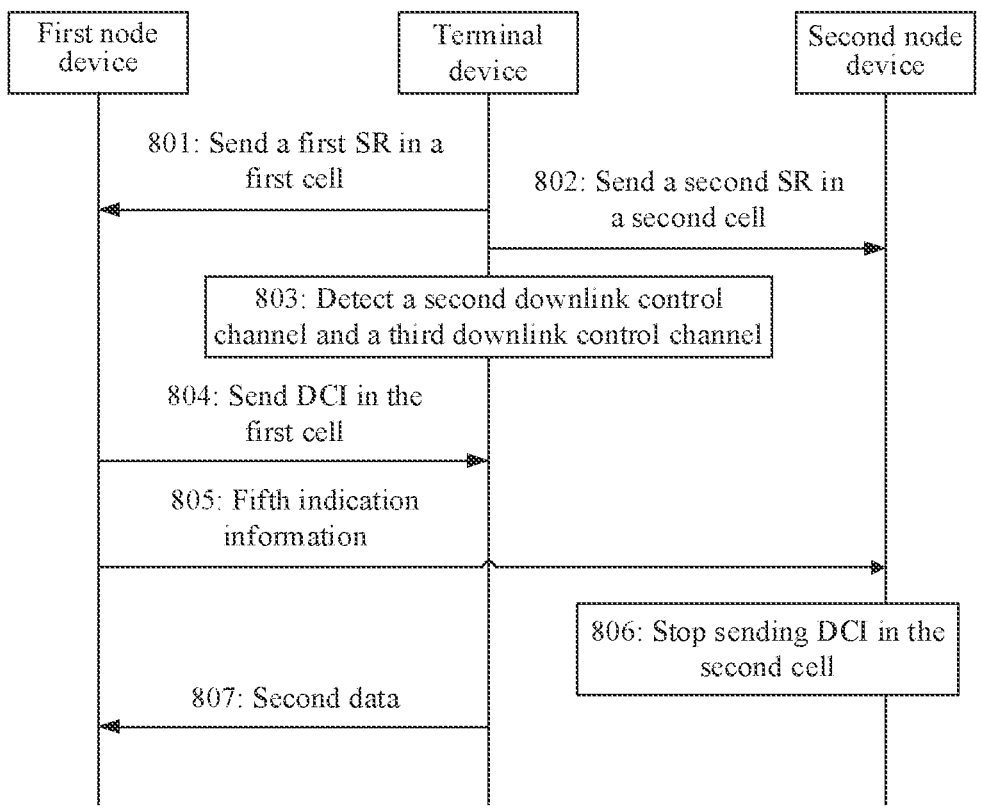
FIG. 8 is a schematic flowchart of a sixth wireless communication method according to an embodiment of this application.

Based on the application scenario shown in FIG. 2, FIG. 8 is a schematic flowchart of a sixth wireless communication method according to an embodiment of this application. As shown in FIG. 8, the schematic flowchart may include the following steps.

801: A terminal device sends, in a first cell, a first SR to a first node device.

Before sending second data, the terminal device sends, in the first cell, the first SR to the first node device. The first SR is used to request to send the second data.

802: The terminal device sends, in a second cell, a second SR to a second node device.

When sending, in the first cell, the first SR to the first node device, the terminal device may also simultaneously send, in the second cell, the second SR to the second node device. Both the first SR and the second SR are used to request to send the second data.

It should be noted that, in this embodiment and subsequent embodiments, only an example in which the SR used to request the second data is sent to the first node device and the second node device is used for description, and the SR used to request the second data may alternatively be sent to more node devices. This is not limited herein.

In this embodiment, a resource used to carry the first SR of the first node device corresponds to a resource used to carry the second SR of the first node device. A correspondence between the resource used to carry the first SR of the first node device and the resource used to carry the second SR of the first node device is similar to that described in step 701 in FIG. 7, and details are not described herein again.

Optionally, in this embodiment, the terminal device performs, in the first cell, RRC communication with the node device, in other words, the first cell is a first PCell. Alternatively, the terminal device may perform, in the second cell, RRC communication with the node device, in other words, the second cell may be a second PCell. Alternatively, the terminal device may not perform, in the second cell, RRC communication with the node device, in other words, the second cell may be an SCell.

In this embodiment, the terminal device may simultaneously perform step 801 and step 802, or may first perform step 801 and then perform step 802, or may first perform step 802 and then perform step 801. This is not limited herein.

803: The terminal device detects a second downlink control channel and a third downlink control channel.

After sending, in the first cell, the first SR to the node device and sending, in the second cell, the second SR to the node device, the terminal device detects the second downlink control channel in the first cell, and detects the third downlink control channel in the second cell.

The second downlink control channel is a control channel used by the node device to send DCI in the first cell, and the third downlink control channel is a control channel used by the node device to send DCI in the second cell.

804: The first node device sends, in the first cell, the DCI to the terminal device.

After receiving the first SR in the first cell, the first node device sends the DCI to the terminal device on the second downlink control channel. The DCI corresponds to the second data, and the DCI includes a parameter, for example, HARQ information and power control, that is used to transmit the second data.

805: The first node device sends fifth indication information to the second node device.

The first node device sends the fifth indication information to the second node device. The fifth indication information is used to indicate that the first node device sends, in the first cell, the DCI to the terminal device. In other words, the fifth indication information is used to indicate the second node device not to send, in the second cell, the DCI to the terminal device.

It should be noted that the first node device may send the fifth indication information to the second node device before sending the DCI to the terminal device, or may send the fifth indication information to the second node device after sending the DCI to the terminal device, or may simultaneously send the fifth indication information to the second node device when sending the DCI to the terminal device. This is not limited herein.

It should be noted that step 805 is an optional step. During actual application, step 805 may be performed, or may not be performed.

806: The second node device stops sending, in the second cell, the DCI to the terminal device.

After determining that the first node device sends, in the first cell, the DCI to the terminal device, the second node device does not send the DCI to the terminal device. The second node device may determine, based on the fifth indication information, that the first node device sends, in the first cell, the DCI to the terminal device.

Specifically, after receiving the second SR in the second cell, the second node device determines, based on the correspondence between the resource used to carry the first SR of the first node device and the resource used to carry the second SR of the first node device, that both the first SR and the second SR are used to request the second data. After the first node device sends, in the first cell, the DCI to the terminal device based on the first SR, the second node device no longer sends the DCI to the terminal device.

It may be understood that after receiving the fifth indication information, the second node device does not send the DCI to the terminal device. This saves network resources.

807: The terminal device sends the second data.

The terminal device receives the DCI sent by the second node device, and sends, in the first cell, the second data to the first node device based on the DCI. It should be noted that the terminal device may alternatively send, in the second cell, the second data to the second node device; or may send, in the first cell, the second data to the first node device, and send, in the second cell, the second data to the second node device.

In this embodiment, the terminal device sends, in the first cell, the first SR to the first node device, and sends, in the second cell, the second SR to the second node device, where the resource used to carry the first SR corresponds to the resource used to carry the second SR, so that the first node device and the second node device may determine, based on the correspondence between the resource used to carry the first SR and the resource used to carry the second SR, that the first SR and the second SR are used to request to send the second data. Therefore, in this embodiment, the terminal device sends the SRs to at least two node devices, so that robustness of transmitting the SR is improved, thereby improving robustness of transmitting the second data.

The foregoing describes the sixth wireless communication method provided in the embodiments of this application. The following describes another wireless communication method provided in the embodiments of this application.

Figure 9:
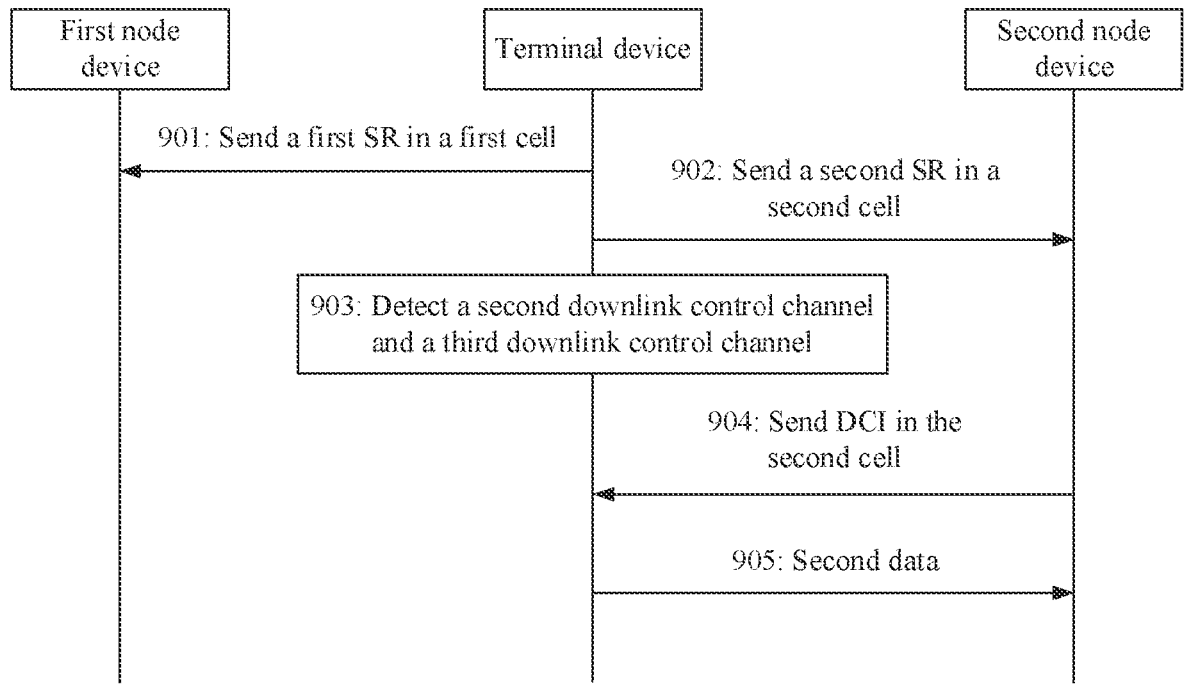
FIG. 9 is a schematic flowchart of a seventh wireless communication method according to an embodiment of this application.

Based on the application scenario shown in FIG. 2, FIG. 9 is a schematic flowchart of a seventh wireless communication method according to an embodiment of this application. As shown in FIG. 9, the schematic flowchart may include the following steps.

901: A terminal device sends, in a first cell, a first SR to a first node device.

902: The terminal device sends, in a second cell, a second SR to a second node device.

903: The terminal device detects a second downlink control channel and a third downlink control channel.

In this embodiment, step 901 to step 903 are similar to step 801 to step 803 in the embodiment corresponding to FIG. 8. Details are not described herein again.

904: The second node device sends, in the second cell, DCI to the terminal device.

The second node device receives the second SR in the second cell, and sends the DCI to the terminal device on the third downlink control channel, and the third downlink control channel is a control channel used by the second node device to send the DCI in the second cell. The DCI includes a parameter, for example, HARQ information and power control, that is used to transmit second data.

905: The terminal device sends the second data.

The terminal device receives the DCI sent by the node device, and sends, in the second cell, the second data to the second node device. It should be noted that the terminal device may alternatively send, in the first cell, the second data to the first node device; or may send, in the first cell, the second data to the first node device, and send, in the second cell, the second data to the second node device.

In this embodiment, the terminal device sends, in the first cell, the first SR to the first node device, and sends, in the second cell, the second SR to the second node device, where a resource used to carry the first SR corresponds to a resource used to carry the second SR, so that the first node device and the second node device may determine, based on a correspondence between the resource used to carry the first SR and the resource used to carry the second SR, that the first SR and the second SR are used to request to send the second data. Therefore, in this embodiment, the terminal device sends the SRs to at least two node devices, so that robustness of transmitting the SR is improved, thereby improving robustness of transmitting the second data.

The foregoing describes the seventh wireless communication method provided in the embodiments of this application. The following describes another wireless communication method provided in the embodiments of this application.

Figure 10:
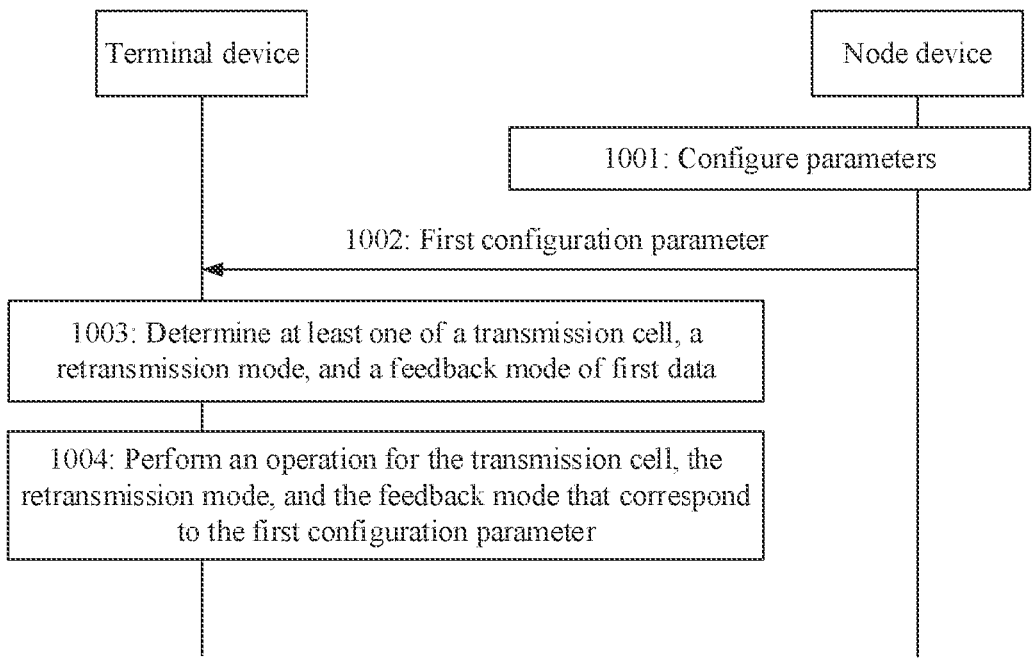
FIG. 10 is a schematic flowchart of an eighth wireless communication method according to an embodiment of this application.

FIG. 10 is a schematic flowchart of an eighth wireless communication method according to an embodiment of this application. As shown in FIG. 10, the schematic flowchart may include the following steps.

1001: A node device configures parameters.

The node device configures the parameters for a terminal device based on a service type of a service. For example, the node device may configure the parameters for the terminal device based on quality of service (quality of service. QoS) corresponding to the service type of the service. The quality of service may correspond to transmission robustness, a transmission latency requirement, or the like.

In this embodiment, the node device configures at least two sets of configuration parameters for the terminal device. For example, a first configuration parameter is configured for a carrier bandwidth used to transmit a first service, and a second configuration parameter is configured for a carrier bandwidth used to transmit a second service. Different configuration parameters correspond to different transmission cells, different retransmission modes, and/or different feedback modes. For example, the first configuration parameter and the second configuration parameter correspond to different transmission cells, different retransmission modes, and/or different feedback modes. For example, in an implementation, the first configuration parameter corresponds to a first transmission cell, a first retransmission mode, and a first feedback mode, and the second configuration parameter corresponds to a second transmission cell, a second retransmission mode, and a second feedback mode. In another implementation, alternatively, the first configuration parameter may correspond to a first transmission cell, a first retransmission mode, and a first feedback mode, and the second configuration parameter may correspond to a second transmission cell, the first retransmission mode, and the first feedback mode. In this embodiment and subsequent embodiments, only an example in which the first configuration parameter corresponds to the first transmission cell, the first retransmission mode, and the first feedback mode, and the second configuration parameter corresponds to the second transmission cell, the second retransmission mode, and the second feedback mode is used for description.

Specifically, the configuration parameters for the terminal device may include a terminal device identifier, a data channel parameter, and a control channel parameter. The first configuration parameter and the second configuration parameter correspond to different terminal device identifiers, different data channel parameters, and/or different control channel parameters. It should be noted that the terminal device identifier includes at least a radio network temporary identifier (radio network temporary identity, RNTI). The data channel parameter includes at least a resource block group (resource block group, RBG) table, a time domain resource allocation table, a modulation and coding scheme (modulation and coding scheme, MCS) table, and a channel quality information (channel quality information, CQI)

table. The control channel parameter includes at least a DCI format. In other words, the first configuration parameter and the second configuration parameter correspond to different RNTIs, different DCI formats, different RBG tables, different time domain resource allocation tables, different MCS tables, and/or different CQI tables.

It may be understood that the node device may determine, based on a service type corresponding to first data, a configuration parameter used to transmit the first data. For example, the node device configures the first configuration parameter for the terminal device based on a service corresponding to the first data.

1002: The terminal device obtains the first configuration parameter.

The terminal device obtains the first configuration parameter from a network device. The first configuration parameter is the configuration parameter for transmitting the first data, the first configuration parameter indicates at least one of a transmission cell, a retransmission mode, and a feedback mode of the first data, and the first configuration parameter includes at least one of the terminal device identifier, the data channel parameter, and the control channel parameter.

1003: The terminal device determines, based on the first configuration parameter, the at least one of the transmission cell, the retransmission mode, and the feedback mode of the first data.

The terminal device determines the terminal device identifier, the data channel parameter, and the control channel parameter in the obtained first configuration parameter, and determines the at least one of the transmission cell, the retransmission mode, and the feedback mode of the first data based on at least one of the terminal device identifier, the data channel parameter, and the control channel parameter.

It should be noted that in this embodiment and subsequent embodiments, only an example in which the transmission cell, the retransmission mode, and the feedback mode of the first data are determined based on one of the terminal device identifier, the data channel parameter, and the control channel parameter is used for description.

The following uses an example in which the DCI format is used as the control channel parameter, an example in which the RNTI is used as the terminal device identifier, and examples in which the MCS table, the RBG configuration table, the time domain resource allocation table, and the CQI table are separately used as the data control channel, to describe the determining the transmission cell, the retransmission mode, and the feedback mode of the first data by the terminal device.

1. The Control Channel Parameter is the DCI Format.

The terminal device may determine the transmission cell, the retransmission mode, and the feedback mode of the first data based on the DCI format. It should be noted that different DCI formats may mean that payloads of DCI are different, or may mean that DCI includes different bit fields, or may mean that DCI includes same bit fields but occupies different quantities of bits.

Specifically, a quantity of bit fields included in a DCI format corresponding to the first transmission cell, the first retransmission mode, and the first feedback mode of the first data is different from a quantity of bit fields included in a DCI format corresponding to the second transmission cell, the second retransmission mode, and the second feedback mode of the first data, so that the terminal device can determine the transmission cell, the retransmission mode, and the feedback mode of the first data based on the quantity of bit fields included in the DCI format.

For the bit field included in the DCI, the terminal device may alternatively determine the transmission cell, the retransmission mode, and the feedback mode of the first data based on a value range of the bit field in the DCI format. For example, a value range of the bit field in the DCI format corresponding to the first transmission cell, the first retransmission mode, and the first feedback mode of the first data is different from a value range of the bit field in the DCI format corresponding to the second transmission cell, the second retransmission mode, and the second feedback mode of the first data. The value range of the bit field may be a value range of the quantity of bits in the bit field, or may be a value range of a value represented by a bit in the bit field.

For the quantity of bits included in the DCI, the terminal device may alternatively determine the transmission cell, the retransmission mode, and the feedback mode of the first data based on the quantity of bits included in the DCI. For example, a quantity of bits in a bit field used for frequency domain scheduling, time domain scheduling, and/or MCS indication in the DCI format corresponding to the first transmission cell, the first retransmission mode, and the first feedback mode of the first data is different from a quantity of bits in a bit field used for frequency domain scheduling, time domain scheduling, and/or MCS indication in the DCI format corresponding to the second transmission cell, the second retransmission mode, and the second feedback mode of the first data.

2. The Control Channel Parameter is an RNTI Type.

The terminal device may alternatively determine the transmission cell, the retransmission mode, and the feedback mode of the first data based on the RNTI type. Specifically, in a process in which the terminal device obtains DCI, the terminal device may monitor the DCI by using different RNTIs, and determine an RNTI corresponding to detected DCI. Then, the terminal device determines the transmission cell, the retransmission mode, and the feedback mode of the first data based on the RNTI corresponding to the detected DCI.

For example, the first transmission cell, the first retransmission mode, and the first feedback mode of the first data correspond to one or more of a newly-defined cell radio network temporary identifier (new C-RNTI), a newly-defined configured scheduling radio network temporary identifier (new CS-RNTI), and a newly-defined semi-persistent channel state information radio network temporary identifier (new SP-CSI-RNTI), and the second transmission cell, the second retransmission mode, and the second feedback mode of the first data correspond to one or more of a cell radio network temporary identifier (cell RNTI, C-RNTI), a configured scheduling radio network temporary identifier (configured scheduling RNTI, CS-RNTI), and a semi-persistent channel state information radio network temporary identifier (semi-persistent channel state information RNTI, SP-CSI-RNTI).

3. The Data Channel Parameter is the RBG Configuration Table.

The terminal device may alternatively determine the transmission cell, the retransmission mode, and the feedback mode of the first data based on the RBG configuration table. For example, an RBG in a first RBG configuration table corresponding to the first transmission cell, the first retransmission mode, and the first feedback mode of the first data is greater than an RBG in a second RBG configuration table corresponding to the second transmission cell, the second retransmission mode, and the second feedback mode of first data. For example, a smallest RBG in the first RBG configuration table may be greater than a largest RBG in the second RBG configuration table, or a largest RBG in the first RBG configuration table may be greater than a largest RBG in the second RBG configuration table. This is not limited herein. The terminal device may determine, based on the RBG configuration table, the transmission cell, the retransmission mode, and the feedback mode of the first data by using a size of the RBG in the RBG configuration table.

In this embodiment, an RBG greater than a preset threshold may be configured in the RBG configuration table, so that on a premise of transmitting a same amount of data, a quantity of symbols required for transmitting the first data can be reduced, thereby reducing a latency of transmitting the first data, reducing a payload size of DCI for scheduling the first data, improving robustness of transmitting the DCI, and reducing overheads for parsing the DCI 4. The Data Channel Parameter is the Time Domain Resource Allocation Table.

The terminal device may alternatively determine the transmission cell, the retransmission mode, and the feedback mode of the first data based on the time domain resource allocation table. Specifically, maximum quantities of rows or maximum quantities of columns in time domain resource allocation tables configured for different transmission cells, retransmission modes, and feedback modes may be different, in other words, the terminal device may determine the transmission cell, the retransmission mode, and the feedback mode of the first data based on the maximum quantity of rows or the maximum quantity of columns in the time domain resource allocation table. For example, a maximum quantity of rows in a time domain resource allocation table that may be configured for the first transmission cell, the first retransmission mode, and the first feedback mode of the first data is 4, and a maximum quantity of rows in a time domain resource allocation table that may be configured for the second transmission cell, the second retransmission mode, and the second feedback mode of the first data is 16.

In this embodiment, a time domain resource allocation table whose quantity of rows is less than a preset threshold may be configured, thereby reducing a payload size of DCI for scheduling the first data, improving robustness of transmitting the DCI, and reducing overheads for parsing the DCI.

5. The Data Channel Parameter is the MCS Table.

The terminal device may alternatively determine the transmission cell, the retransmission mode, and the feedback mode of the first data based on the MCS table. Specifically, maximum quantities of rows or maximum quantities of columns in MCS tables configured for different transmission cells, retransmission modes, and feedback modes may be different, in other words, the terminal device may alternatively determine the transmission cell, the retransmission mode, and the feedback mode of the first data based on the maximum quantity of rows or the maximum quantity of columns in the MCS table. For example, a maximum quantity of rows in an MCS table configured for the first transmission cell, the first retransmission mode, and the first feedback mode of the first data is 4, and a maximum quantity of rows in an MCS table configured for the second transmission cell, the second retransmission mode, and the second feedback mode of the first data is 16.

Optionally, target code rates supported in the MCS tables configured for the different transmission cells, retransmission modes, and feedback modes may also be different. The target code rate may be a maximum code rate or a minimum code rate. In other words, the terminal device may alternatively determine the transmission cell, the retransmission mode, and the feedback mode of the first data based on the target code rate in the MCS table. For example, a target code rate supported in the MCS table configured for the first transmission cell, the first retransmission mode, and the first feedback mode of the first data is a first code rate, and a target code rate supported in the MCS table configured for the second transmission cell, the second retransmission mode, and the second feedback mode of the first data is a second code rate.

Optionally, highest modulation orders supported in the MCS tables configured for the different transmission cells, retransmission modes, and feedback modes may also be different. In other words, the terminal device may alternatively determine the transmission cell, the retransmission mode, and the feedback mode of the first data based on the highest modulation order supported in the MCS table. For example, a highest modulation order supported in the MCS table configured for the first transmission cell, the first retransmission mode, and the first feedback mode of the first data is a first modulation order, and a highest modulation order supported in the MCS table configured for the second transmission cell, the second retransmission mode, and the second feedback mode of the first data is a second modulation order.

In this embodiment, a target code rate lower than a preset threshold is configured in the MCS table, so that an anti-interference capability in a process of transmitting the first data can be improved, thereby improving transmission robustness. In addition, an MCS table whose quantity of rows is less than a preset threshold is configured, thereby reducing a payload size of DCI for scheduling the first data, improving robustness of transmitting the DCI, and reducing overheads for parsing the DCI by a communications device.

6. The Data Channel Parameter is the CQI Table.

The terminal device may alternatively determine the transmission cell, the retransmission mode, and the feedback mode of the first data based on the CQI table. Specifically, target code rates supported in CQI tables configured for different transmission cells, retransmission modes, and feedback modes may be different. The target code rate may be a maximum code rate or a minimum code rate. In other words, the terminal device may alternatively determine the transmission cell, the retransmission mode, and the feedback mode of the first data based on the target code rate in the CQI table. For example, a target code rate supported in an MCS table configured for the first transmission cell, the first retransmission mode, and the first feedback mode of the first data is a third code rate, and a target code rate supported in an MCS table configured for the second transmission cell, the second retransmission mode, and the second feedback mode of the first data is a fourth code rate.

In this embodiment, a target code rate lower than a preset threshold is configured in the MCS table, so that an anti-interference capability in a process of transmitting the first data can be improved, thereby improving transmission robustness.

The following describes the transmission cell, the retransmission mode, and the feedback mode that correspond to the first configuration parameter:

The retransmission mode of the first data includes: The terminal device incorrectly receives the first data in a first cell. The terminal device sends first indication information in a second cell, where the first indication information is used to indicate that the first data is incorrectly received in the first cell, or is used to request transmission of the first data in the second cell. The terminal device receives the first data in the second cell.

The transmission cell of the first data includes the first cell and the second cell.

The feedback mode of the first data includes: When incorrectly receiving the first data in the first cell, the terminal device sends the first indication information in the second cell, where the first indication information is used to indicate that the first data is incorrectly received in the first cell, or is used to request transmission of the first data in the second cell.

The feedback mode of the first data further includes: The terminal device sends second indication information in the first cell, where the second indication information is used to indicate that the first data is incorrectly received in the first cell, or is used to request transmission of the first data in the first cell.

The retransmission mode of the first data further includes: The terminal device correctly receives the first data in a first cell. The terminal device sends third indication information in a second cell, where the third indication information is used to indicate that the first data is correctly received in the first cell, or is used to request to stop transmission of the first data in the second cell. The terminal device stops receiving the first data in the second cell.

The feedback mode of the first data further includes: The terminal device sends the third indication information in the second cell, where the third indication information is used to indicate that the first data is correctly received in the first cell, or is used to request to stop transmission of the first data in the second cell.

The feedback mode of the first data further includes. The terminal device sends fourth indication information in the first cell, where the fourth indication information is used to indicate that the first data is correctly received in the first cell, or is used to request to stop transmission of the first data in the first cell.

1004: The terminal device performs an operation for the transmission cell, the retransmission mode, and the feedback mode that correspond to the first configuration parameter.

That the terminal device performs an operation for the transmission cell, the retransmission mode, and the feedback mode that correspond to the first configuration parameter is similar to the embodiment corresponding to FIG. 3, FIG. 4, FIG. 5, or FIG. 6. Details are not described herein again.

In this embodiment, the node device configures the parameters for the terminal device based on the service type of the service. Different configuration parameters may be configured for different services, and different configuration parameters correspond to different transmission cells, retransmission modes, and feedback modes. In this way, the terminal device may determine the transmission cell, the retransmission mode, and the feedback mode of the data based on the configuration parameter for the carrier bandwidth. Therefore, in this embodiment, the node device may configure different parameters for the terminal device based on different services, so that different services may correspond to different transmission cells, retransmission modes, and feedback modes. This meets different data transmission requirements of different services.

The foregoing describes the wireless communication method provided in the embodiments of this application. The following describes an apparatus provided in the embodiments of this application.

Figure 11:
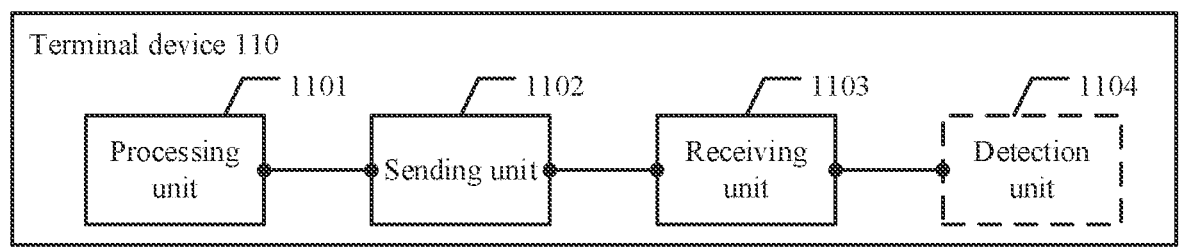
FIG. 11 is a schematic block diagram of a $1^{st}$ terminal device according to an embodiment of this application.

FIG. 11 is a schematic block diagram of a terminal device according to an embodiment of this application. The terminal device 110 includes:

a processing unit 1101, configured to determine that first data is incorrectly received in a first cell, where the first cell is a first primary cell;

a sending unit 1102, configured to send first indication information in a second cell, where the second cell is a secondary cell or a second primary cell, and the first indication information is used to indicate that the first data is incorrectly received in the first cell, or is used to request transmission of the first data in the second cell: and a receiving unit 1103, configured to receive the first data in the second cell.

In a possible implementation, the terminal device 110 further includes a detection unit 1104, configured to detect a first downlink control channel in the second cell, where the first downlink control channel is used by the terminal device to receive the first data.

In another possible implementation, the sending unit 1102 is further configured to send second indication information in the first cell, where the second indication information is used to indicate that the terminal device incorrectly receives the first data in the first cell, or is used to request to transmit, in the first cell, the first data to the terminal device. The terminal device receives the first data in the first cell.

In another possible implementation, the first indication information includes a negative acknowledgement NACK or a scheduling request SR.

In another possible implementation, the second indication information includes a NACK or an SR.

In this embodiment, when the processing unit 1101 determines that the first data is incorrectly received in the first cell, the sending unit 1102 sends the first indication information to anode device. The receiving unit 1103 sends, in the second cell, the first data to the terminal device. Therefore, in this embodiment, the terminal device 110 may trigger, by using the indication information, sending of the data in the second cell to the terminal device 110, so that the terminal device 110 can receive the data in the first cell and the second cell. This improves robustness of data transmission. In addition, before the sending unit 1102 sends the first indication information, the detection unit 1104 does not detect the first data in the second cell. This reduces inter-cell interference and ensures efficiency of spectrum resources.

The foregoing describes the $1^{st}$ terminal device provided in the embodiments of this application. The following describes a node device provided in the embodiments of this application.

Figure 12:
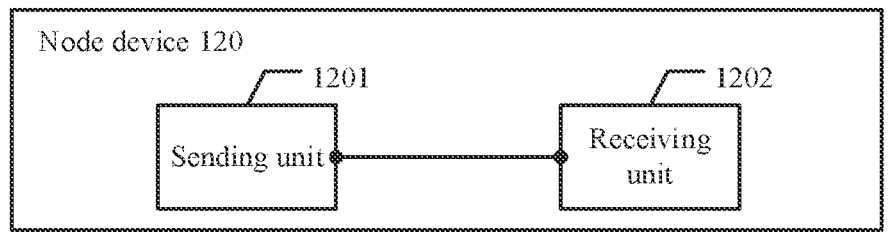
FIG. 12 is a schematic block diagram of a $1^{st}$ node device according to an embodiment of this application.

FIG. 12 is a schematic block diagram of a $1^{st}$ node device according to an embodiment of this application. The node device 120 includes:

a sending unit 1201, configured to send, in a first cell, first data to a terminal device, where the first cell is a first primary cell; and a receiving unit 1202, configured to receive, in a second cell, first indication information from the terminal device, w % here the second cell is a secondary cell or a second primary cell, and the first indication information is used to indicate that the terminal device incorrectly receives the first data in the first cell, or is used to request to send, in the second cell, the first data to the terminal device.

The sending unit 1201 is further configured to send, in the second cell, the first data to the terminal device.

In a possible implementation, the receiving unit 1202 is further configured to receive, in the first cell, second indication information from the terminal device, where the second indication information is used to indicate that the terminal device incorrectly receives the first data in the first cell, or is used to request to transmit, in the first cell, the first data to the terminal device. The sending unit 1201 is further configured to send, in the first cell, the first data to the terminal device.

In another possible implementation, the first indication information includes a negative acknowledgement NACK or a scheduling request SR.

In another possible implementation, the second indication information includes a NACK or an SR.

In this embodiment, the sending unit 1201 sends, in the first cell, the first data to the terminal device. After the receiving unit 1202 receives the first indication information, the sending unit 1201 sends, in the second cell, the first data to the terminal device. Therefore, in this embodiment, after receiving the indication information, the node device 120 sends, in the second cell, the data to the terminal device. This improves robustness of data transmission while ensuring efficiency of spectrum resources.

The foregoing describes the $1^{st}$ node device provided in the embodiments of this application. The following describes a first node device provided in the embodiments of this application.

Figure 13:
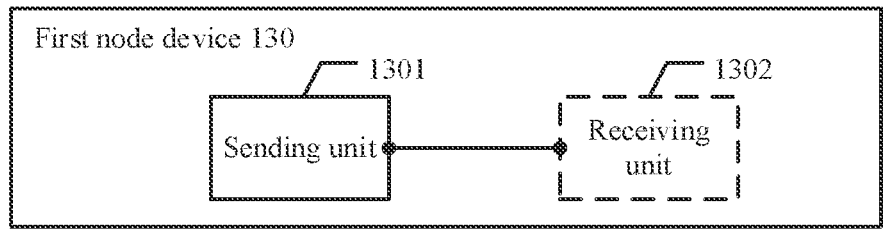
FIG. 13 is a schematic block diagram of a $1^{st}$ first node device according to an embodiment of this application.

FIG. 13 is a schematic block diagram of a $1^{st}$ first node device according to an embodiment of this application. The first node device 130 includes:

a sending unit 1301, configured to send, in a first cell, first data to a terminal device, where the first cell is a first primary cell.

The sending unit 1301 is further configured to send the first data to a second node device, where the first data is to be sent in a second cell by the second node device to the terminal device after the second node device receives first indication information, the first indication information is used to indicate that the terminal device incorrectly receives the first data in the first cell, or is used to request the second node device to send, in the second cell, the first data to the terminal device, and the second cell is a secondary cell or a second primary cell.

In a possible implementation, the first node device 130 further includes a receiving unit 1302. The receiving unit 1302 is configured to receive, in the first cell, second indication information from the terminal device, where the second indication information is used to indicate that the terminal device incorrectly receives the first data in the first cell, or is used to request to transmit, in the first cell, the first data to the terminal device. The sending unit 1301 is further configured to send, in the first cell, the first data to the terminal device.

In another possible implementation, the first indication information includes a negative acknowledgement NACK or a scheduling request SR.

In another possible implementation, the second indication information includes a NACK or an SR.

In this embodiment, the sending unit 1301 may send the first data to the terminal device and the second node device, and the first data is to be sent in the second cell by the second node device to the terminal device after the second node device receives the first indication information. Therefore, in this embodiment, the first node device 130 may send the first data to the second node device, so that after receiving the first indication information, the second node device sends, in the second cell, the first data to the terminal device. In this way, the first data may be sent in both the first cell and the second cell to the terminal device. This improves robustness of data transmission.

The foregoing describes the $1^{st}$ first node device provided in the embodiments of this application. The following describes a second node device provided in the embodiments of this application.

Figure 14:
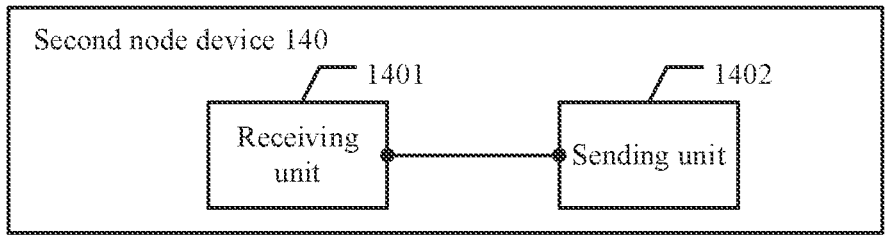
FIG. 14 is a schematic block diagram of a $1^{st}$ second node device according to an embodiment of this application.

FIG. 14 is a schematic block diagram of a $1^{st}$ second node device according to an embodiment of this application. The second node device 140 includes:

a receiving unit 1401, configured to receive, in a second cell, first indication information from a terminal device, where the second indication information is used to indicate that the terminal device incorrectly receives the first data in a first cell, or is used to request to transmit, in the first cell, the first data to the terminal device, the first cell is a first primary cell, and the second cell is a secondary cell or a second primary cell, and a sending unit 1402, configured to send, in the second cell, the first data to the terminal device.

In a possible implementation, the receiving unit 1401 is further configured to receive the first data from a first node device, where the first node device is a node device corresponding to the first cell.

In another possible implementation, the first indication information includes a negative acknowledgement NACK or a scheduling request SR.

The foregoing describes the second node device provided in the embodiments of this application. The following describes a terminal device provided in the embodiments of this application.

In this embodiment, the receiving unit 1401 receives the first indication information sent by the terminal device, and the sending unit 1402 sends, in the second cell, the first data to the terminal device based on the first indication information. Therefore, in this embodiment, the second node device 140 sends, in the second cell, the first data to the terminal device only when receiving the first indication information and determining that the terminal device incorrectly receives the first data in the first cell. This improves robustness of data transmission while ensuring efficiency of spectrum resources.

The foregoing describes the $1^{st}$ second node device provided in the embodiments of this application. The following describes another node device provided in the embodiments of this application.

Figure 15:
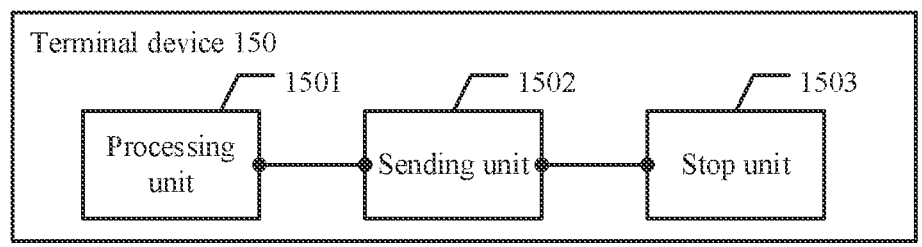
FIG. 15 is a schematic block diagram of a $2^{nd}$ terminal device according to an embodiment of this application.

FIG. 15 is a schematic block diagram of a $2^{nd}$ terminal device according to an embodiment of this application. The terminal device 150 includes:

a processing unit 1501, configured to determine that first data is correctly received in a first cell, where the first cell is a first primary cell;

a sending unit 1502, configured to send third indication information in a second cell, where the second cell is a secondary cell or a second primary cell, and the third indication information is used to indicate that the terminal device correctly receives the first data in the first cell, or is used to request to stop transmission of the first data in the second cell; and a stop unit 1503, configured to stop receiving the first data in the second cell.

In a possible implementation, the stop unit 1503 is further configured to stop detecting a first downlink control channel in the second cell, where the first downlink control channel is used by the terminal device to receive the first data.

In another possible implementation, the sending unit 1502 is further configured to send fourth indication information in the first cell, where the fourth indication information is used to indicate that the terminal device correctly receives the first data in the first cell, or is used to request to stop transmission of the first data in the first cell. The stop unit 1503 is further configured to stop receiving the first data in the first cell.

In another possible implementation, the third indication information includes a positive acknowledgement ACK.

In another possible implementation, the fourth indication information includes a positive acknowledgement ACK.

In this embodiment, when the processing unit 1501 determines that the first data is correctly received, the sending unit 1502 sends the third indication information in the second cell. The stop unit 1503 stops receiving the first data in the second cell. Therefore, in this embodiment, the terminal device 150 may send the indication information in the second cell, to indicate the node device to stop sending the first data in the second cell. This ensures efficiency of spectrum resources and reduces inter-cell interference while preparing two cells to send the first data.

The foregoing describes the $2^{nd}$ terminal device provided in the embodiments of this application. The following describes another node device provided in the embodiments of this application.

Figure 16:
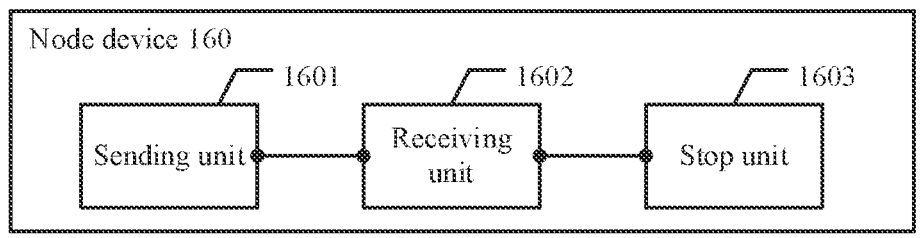
FIG. 16 is a schematic block diagram of a $2^{nd}$ node device according to an embodiment of this application.

FIG. 16 is a schematic block diagram of a $2^{nd}$ node device according to an embodiment of this application. The node device 160 includes:
  a sending unit 1601, configured to send, in a first cell, first data to a terminal device, where the first cell is a first primary cell;
  a receiving unit 1602, configured to receive, in a second cell, third indication information from the terminal device, where the second cell is a secondary cell or a second primary cell, and the third indication information is used to indicate that the terminal device correctly receives the first data in the first cell, or is used to request to stop transmission of the first data in the second cell; and
  a stop unit 1603, configured to stop sending the first data in the second cell.

In a possible implementation, the receiving unit 1602 is further configured to receive, in the first cell, fourth indication information from the terminal device, where the fourth indication information is used to indicate that the terminal device correctly receives the first data in the first cell, or is used to request to stop transmission of the first data in the first cell. The stop unit 1603 is further configured to stop sending the first data in the first cell.

In another possible implementation, the third indication information includes a positive acknowledgement ACK.

In another possible implementation, the fourth indication information includes a positive acknowledgement ACK.

In this embodiment, after the receiving unit 1602 receives the third indication information sent by the terminal device, the stop unit 1603 stops sending, in the second cell, the first data to the terminal device. Therefore, in this embodiment, after receiving the third indication information, the node device 160 does not send the first data in the second cell, so that inter-cell interference can be reduced and efficiency of spectrum resources can be improved while the node device configures at least two cells to transmit the first data.

The foregoing describes the $2^{nd}$ node device provided in the embodiments of this application. The following describes another second node device provided in the embodiments of this application.

Figure 17:
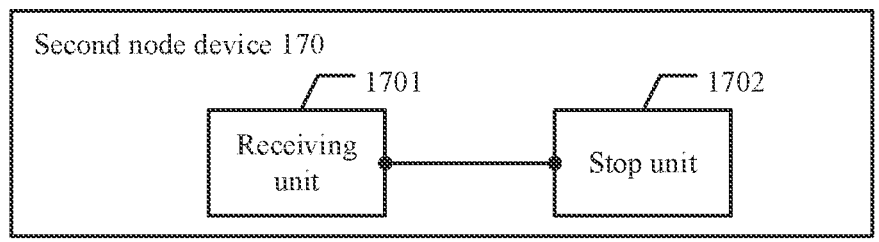
FIG. 17 is a schematic block diagram of a $2^{nd}$ second node device according to an embodiment of this application.

FIG. 17 is a schematic block diagram of a $2^{nd}$ second node device according to an embodiment of this application. The second node device 170 includes:

a receiving unit 1701, configured to receive, in a second cell, third indication information from a terminal device, where the third indication information is used to indicate that the terminal device correctly receives first data in a first cell, or is used to request to stop transmission of the first data in the second cell, the first cell is a first primary cell, and the second cell is a secondary cell or a second primary cell; and
  a stop unit 1702, configured to stop sending the first data in the second cell.

In a possible implementation, the third indication information includes a positive acknowledgement ACK.

In this embodiment, the second node device 170 configures the second cell to transmit the first data to the terminal device, and after the receiving unit 1701 of the second node device 170 receives the third indication information, the stop unit 1702 stops transmitting second data in the second cell. This reduces inter-cell interference and improves use efficiency of spectrum resources.

The foregoing describes the $2^{nd}$ second node device provided in the embodiments of this application. The following describes another terminal device provided in the embodiments of this application.

Figure 18:
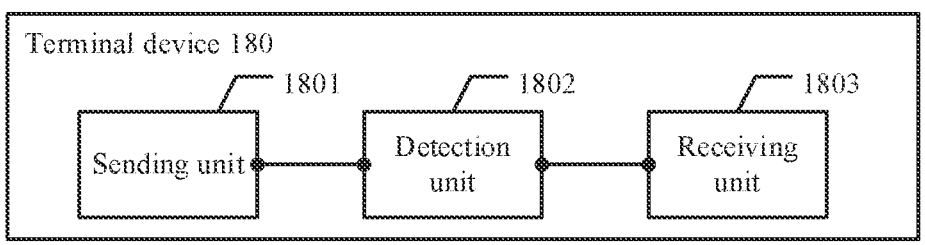
FIG. 18 is a schematic block diagram of a $3^{rd}$ terminal device according to an embodiment of this application.

FIG. 18 is a schematic block diagram of a $3^{rd}$ terminal device according to an embodiment of this application. The terminal device 180 includes:
  a sending unit 1801, configured to send a first scheduling request SR in a first cell, and send a second SR in a second cell, where a resource used to carry the first SR corresponds to a resource used to carry the second SR, and the first SR and the second SR are used to request transmission of second data
  a detection unit 1802, configured to detect a second downlink control channel in the first cell, and detect a third downlink control channel in the second cell; and
  a receiving unit 1803, configured to receive downlink control information DCI on at least one of the second downlink control channel and the third downlink control channel.

The sending unit 1801 is further configured to send the second data based on the DCI.

In a possible implementation, the first cell is a first primary cell, and the second cell is a secondary cell or a second primary cell.

In this embodiment, the sending unit 1801 sends the first scheduling request SR in the first cell, and sends the second SR in the second cell, where the first SR and the second SR are used to request transmission of the second data. Therefore, in this embodiment, the terminal device 180 sends the scheduling requests for the second data in at least two cells, so that robustness of transmitting the SR is improved, thereby improving robustness of transmitting the second data corresponding to the first SR.

The foregoing describes the $3^{rd}$ terminal device provided in the embodiments of this application. The following describes another first node device provided in the embodiments of this application.

Figure 19:
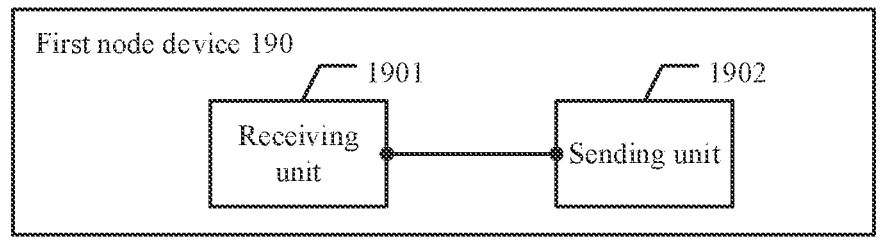
FIG. 19 is a schematic block diagram of a $2^{rd}$ first node device according to an embodiment of this application.

FIG. 19 is a schematic block diagram of a $2^{rd}$ first node device according to an embodiment of this application. The first node device 190 includes:
  a receiving unit 1901, configured to receive, in a first cell, a first scheduling request SR from a terminal device, where a resource used to carry the first SR corresponds to a resource used to carry a second SR, the resource used to carry the second SR is a resource that carries, in a second cell, the second SR from the terminal device, and the first SR and the second SR are used to request transmission of second data; and a sending unit 1902, configured to send, in the first cell, downlink control information DCI to the terminal device, where the DCI is carried on a second downlink control channel, and the DCI includes a parameter used to transmit the second data.

The receiving unit 1901 is further configured to receive, in the first cell, the second data from the terminal device.

In a possible implementation, the sending unit 1902 is further configured to send fifth indication information to a second node device, where the fifth indication information is used to indicate that the first node device sends the DCI in the first cell.

In this embodiment, the sending unit 1902 sends the fifth indication information to the second node device, where the fifth indication information may be used to indicate that the first node device 190 sends, in the first cell, the DCI to the terminal device, so that when receiving the second SR, the second node device does not send DCI to the terminal device. This saves spectrum resources.

The foregoing describes the $2^{nd}$ first node device provided in the embodiments of this application. The following describes another second node device provided in the embodiments of this application.

Figure 20:
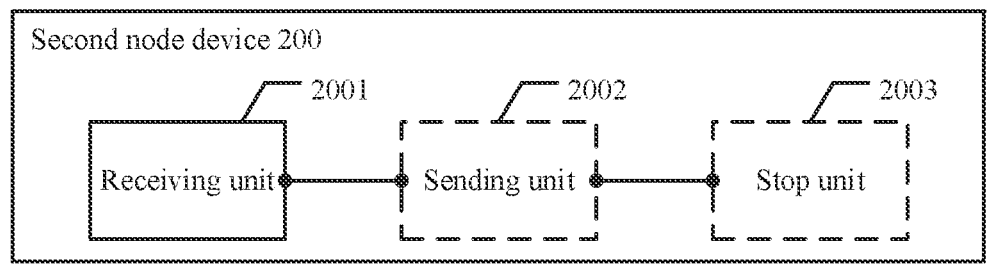
FIG. 20 is a schematic block diagram of a $3^{rd}$ second node device according to an embodiment of this application.

FIG. 20 is a schematic block diagram of a $3^{rd}$ second node device according to an embodiment of this application. The second node device 200 includes a receiving unit 2001, and a sending unit 2002 or a stop unit 2003.

The receiving unit 2001 is configured to receive, in a second cell, a second scheduling request SR from a terminal device, where a resource used to carry the second SR corresponds to a resource used to carry a first SR, the resource used to carry the first SR is a resource that carries, in a first cell, the first SR from the terminal device, and the first SR and the second SR are used to request transmission of second data.

The sending unit 2002 is configured to send, in the second cell, downlink control information DCI to the terminal device, where the DCI is carried on a third downlink control channel. Alternatively, the receiving unit 2001 is configured to receive fifth indication information from a first node device, and the stop unit 2003 is configured to stop sending, in the second cell, the DCI to the terminal device.

In a possible implementation, the receiving unit 2001 is further configured to receive, in the second cell, the second data from the terminal device.

In another possible implementation, the first cell is a first primary cell, and the second cell is a secondary cell or a second primary cell.

In this embodiment, after the receiving unit 2001 receives the fifth indication information, the stop unit 2003 stops sending, in the second cell, the DCI to the terminal device. Therefore, in this embodiment, the second node device 200 may determine, based on the fifth indication information, that the first node device sends, in the first cell, the DCI to the terminal device: and may not send the DCI to the terminal device when receiving the second SR. This saves spectrum resources.

The foregoing describes the $3^{rd}$ second node device provided in the embodiments of this application. The following describes another node device provided in the embodiments of this application.

Figure 21:
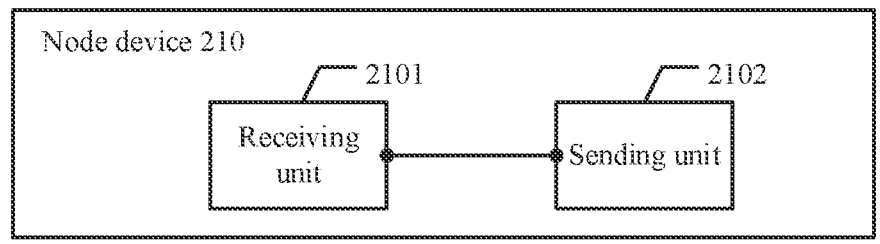
FIG. 21 is a schematic block diagram of a $3^{rd}$ node device according to an embodiment of this application.

FIG. 21 is a schematic block diagram of a $3^{rd}$ node device according to an embodiment of this application. The node device 210 includes:

a receiving unit 2101, configured to receive a first scheduling request SR in a first cell, and receive a second SR in a second cell, where a resource used to carry the second SR corresponds to a resource used to carry the first SR; and a sending unit 2102, configured to send, in at least one of the first cell and the second cell, downlink control information DCI to a terminal device, where the DCI sent in the first cell is carried on a second downlink control channel, the DCI sent in the second cell is carried on a third downlink control channel, and the DCI includes a parameter used to transmit second data.

The receiving unit 2101 is further configured to receive, in the at least one of the first cell and the second cell, the second data from the terminal device.

In a possible implementation, the first cell is a first primary cell, and the second cell is a secondary cell or a second primary cell.

In this embodiment, the receiving unit 2101 receives, in the first cell and the second cell, the first SR and the second SR that are used to schedule the same data. This improves robustness of receiving the SR.

The foregoing describes the $3^{rd}$ node device provided in the embodiments of this application. The following describes another terminal device provided in the embodiments of this application.

Figure 22:
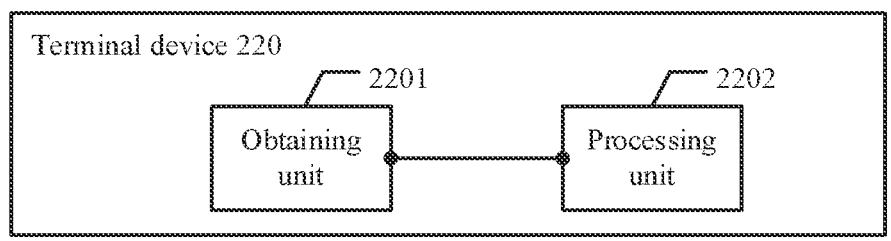
FIG. 22 is a schematic block diagram of a $4^{rd}$ terminal device according to an embodiment of this application.

FIG. 22 is a schematic block diagram of a $4^{th}$ terminal device according to an embodiment of this application. The terminal device 220 includes:

an obtaining unit 2201, configured to obtain a first configuration parameter for a carrier bandwidth, where the carrier bandwidth is a carrier bandwidth for transmitting first data, at least two sets of configuration parameters are preconfigured for the carrier bandwidth, and the at least two sets of configuration parameters include the first configuration parameter; and a processing unit 2202, configured to determine, based on the first configuration parameter, at least one of a transmission cell, a retransmission mode, and a feedback mode of the first data.

In a possible implementation, the first configuration parameter includes at least one of a terminal device identifier, a data channel parameter, and a control channel parameter.

In another possible implementation, the retransmission mode includes: The terminal device incorrectly receives the first data in a first cell. The terminal device sends first indication information in a second cell, where the first indication information is used to indicate that the first data is incorrectly received in the first cell, or is used to request transmission of the first data in the second cell. The terminal device receives the first data in the second cell.

In another possible implementation, the transmission cell includes at least the first cell and the second cell, the first cell is a first primary cell, and the second cell is a secondary cell or a second primary cell.

In another possible implementation, the feedback mode includes: When incorrectly receiving the first data in the first cell, the terminal device sends the first indication information in the second cell, where the first indication information is used to indicate that the first data is incorrectly received in the first cell, or is used to request transmission of the first data in the second cell.

In another possible implementation, the feedback mode further includes: The terminal device sends second indication information in the first cell, where the second indication information is used to indicate that the first data is incorrectly received in the first cell, or is used to request transmission of the first data in the first cell.

In another possible implementation, the retransmission mode further includes: The terminal device correctly receives the first data in a first cell. The terminal device sends third indication information in a second cell, where the third indication information is used to indicate that the first data is correctly received in the first cell, or is used to request to stop transmission of the first data in the second cell. The terminal device stops receiving the first data in the second cell.

In another possible implementation, the feedback mode further includes: The terminal device sends the third indication information in the second cell, where the third indication information is used to indicate that the first data is correctly received in the first cell, or is used to request to stop transmission of the first data in the second cell.

In another possible implementation, the feedback mode further includes: The terminal device sends fourth indication information in the first cell, where the fourth indication information is used to indicate that the first data is correctly received in the first cell, or is used to request to stop transmission of the first data in the first cell.

In this embodiment, the at least two sets of configuration parameters are configured for the carrier bandwidth, and the at least two sets of configuration parameters include the first configuration parameter. The obtaining unit 2201 obtains the first configuration parameter for the carrier bandwidth, and the processing unit 2202 determines the at least one of the transmission cell, the retransmission mode, and the feedback mode of the first data based on the first configuration parameter. Therefore, in this embodiment, the terminal device may determine the at least one of the transmission cell, the retransmission mode, and the feedback mode of the first data based on the configuration parameter for the carrier bandwidth, to meet different data transmission requirements of different services.

The foregoing describes the terminal device provided in the embodiments of this application. The following describes another terminal device provided in the embodiments of this application.

Figure 23:
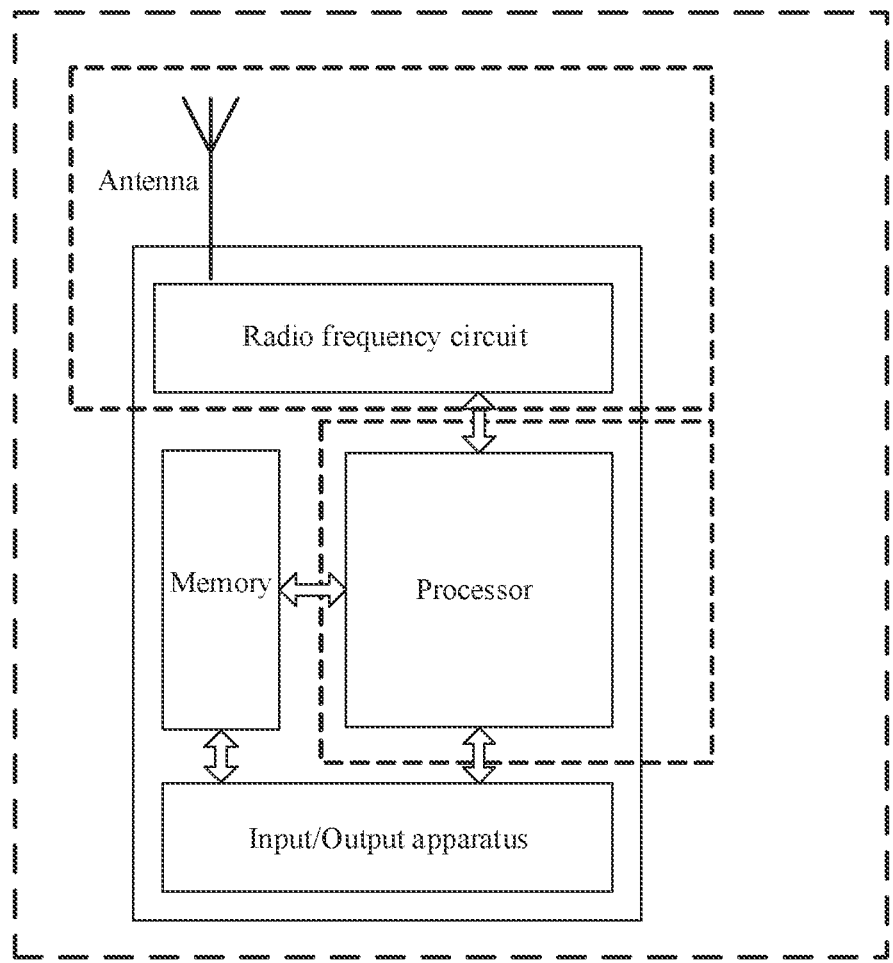
FIG. 23 is a schematic structural diagram of hardware of a terminal device according to an embodiment of this application.

FIG. 23 is a schematic structural diagram of hardware of a terminal device according to an embodiment of this application. FIG. 23 is a simplified schematic structural diagram of the hardware of the terminal device. For ease of understanding and illustration, an example in which the terminal device is a mobile phone is used in FIG. 23. As shown in FIG. 23, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in an electromagnetic wave form. The input/output apparatus, such as a touchscreen, a display, or a keyboard, is mainly configured to: receive data entered by a user, and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 23 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit and that is configured to implement a receiving function may be considered as a receiving unit, and a component that is in the transceiver unit and that is configured to implement a sending function may be considered as a sending unit. In other words, the transceiver unit includes the receiving unit and the sending unit. The transceiver unit may also be sometimes referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like.

The transceiver unit is configured to perform a sending operation and a receiving operation on a terminal device side in the foregoing method embodiments, and the processing unit is configured to perform a processing operation other than the sending operation and the receiving operation of the terminal device in the foregoing method embodiments.

Figure 24:
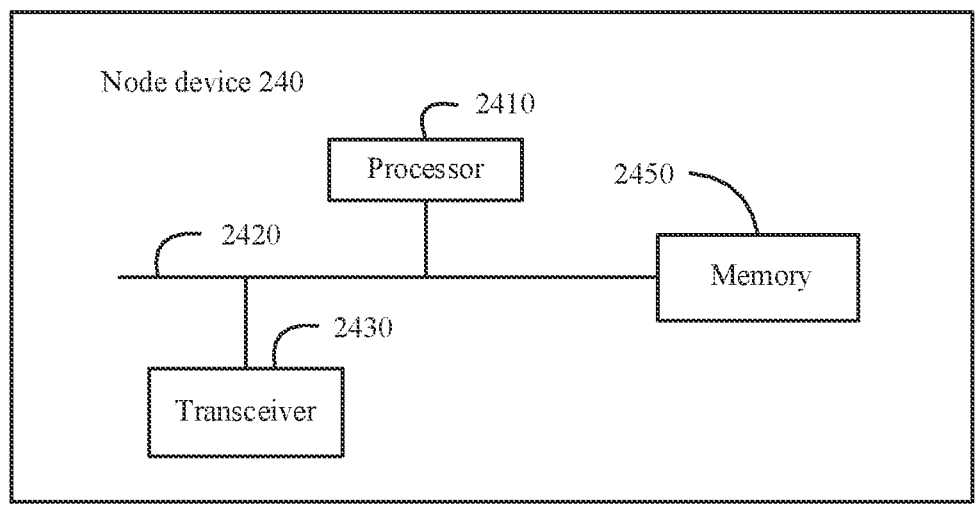
FIG. 24 is a schematic structural diagram of hardware of a node device according to an embodiment of this application.

FIG. 24 is a schematic structural diagram of hardware of a node device according to an embodiment of this application. As shown in FIG. 24, the node device 240 includes:

at least one processor 2410, a memory 2450, and a transceiver 2430. The transceiver may include a receiver and a transmitter. The memory 2450 may include a read-only memory and/or a random access memory, and provide operation instructions and data for the processor 2410. A part of the memory 2450 may further include a non-transitory random access memory. The memory and the processor may be independent of each other and connected via a bus or an interface, or may be integrated together.

In some implementations, the memory 2450 stores the following elements: an executable module or a data structure, or a subset thereof, or an extended set thereof.

In this embodiment of this application, a corresponding operation is performed by invoking the operation instructions (where the operation instructions may be stored in an operating system) stored in the memory 2450. The processor 2410 controls an operation of the node device 240. The processor 2410 may also be referred to as a CPU (Central Processing Unit, central processing unit). The memory 2450 may include the read-only memory and the random access memory, and provide the instructions and data for the processor 2410. The part of the memory 2450 may further include the non-transitory random access memory. During specific application, the components of the node device 240 are coupled together by using a bus system 2420. The bus system 2420 may further include a power bus, a control bus, a status signal bus, and the like in addition to a data bus. However, for clear description, various types of buses in the figure are marked as the bus system 2420.

The methods disclosed in the foregoing embodiments of this application may be applied to the processor 2410, or may be implemented by the processor 2410. The processor 2410 may be an integrated circuit chip and has a signal processing capability. In an implementation process, the steps in the foregoing methods can be implemented by using a hardware integrated logic circuit in the processor 2410, or by using instructions in a form of software. The processor 2410 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 2410 may implement or perform the methods, the steps, and logical block diagrams that are disclosed in the embodiments of this application. The general purpose processor may be a microprocessor, or the processor may be any conventional processor or the like. The steps of the methods disclosed with reference to the embodiments of this application may be directly executed by using a hardware decoding processor, or may be executed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory 2450. The memory 2450 may be a physically independent unit, or may be integrated into the processor 2410. The processor 2410 reads information in the memory 2450, and completes the steps of the foregoing methods in combination with hardware of the processor 2410.

In this embodiment, the transceiver 2430 is configured to perform receiving and sending operation steps on a node device side in the foregoing method embodiments, or is configured to perform steps of sending and receiving data on a node device side in another optional embodiment.

The processor 2410 is configured to perform a data processing step on the node device side in the foregoing method embodiments, or is configured to perform a data processing step on the node device side in the another optional embodiment.

Figure 25:
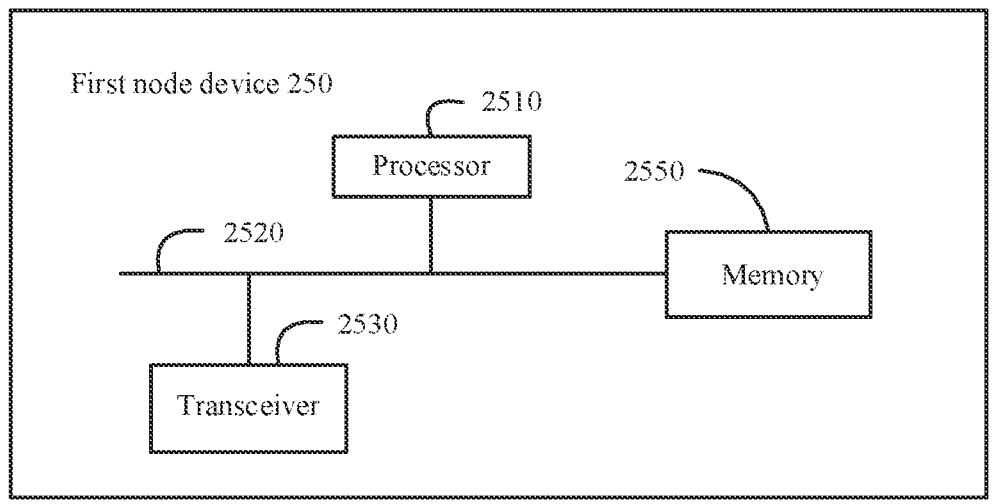
FIG. 25 is a schematic structural diagram of hardware of a first node device according to an embodiment of this application.

FIG. 25 is a schematic structural diagram of hardware of a first node device according to an embodiment of this application. As shown in FIG. 25, the first node device 250 includes at least one processor 2510, a memory 2550, a transceiver 2530, and a bus system 2520.

Functional structures of the at least one processor 2510, the memory 2550, the transceiver 2530, and the bus system 2520 are similar to those in FIG. 24. Details are not described herein again.

In this embodiment, the transceiver 2530 is configured to perform receiving and sending operation steps on a first node device side in the foregoing method embodiments, or is configured to perform steps of sending and receiving data on a first node device side in another optional embodiment.

The processor 2510 is configured to perform a data processing step on the first node device side in the foregoing method embodiments, or is configured to perform a data processing step on the first node device side in the another optional embodiment.

Figure 26:
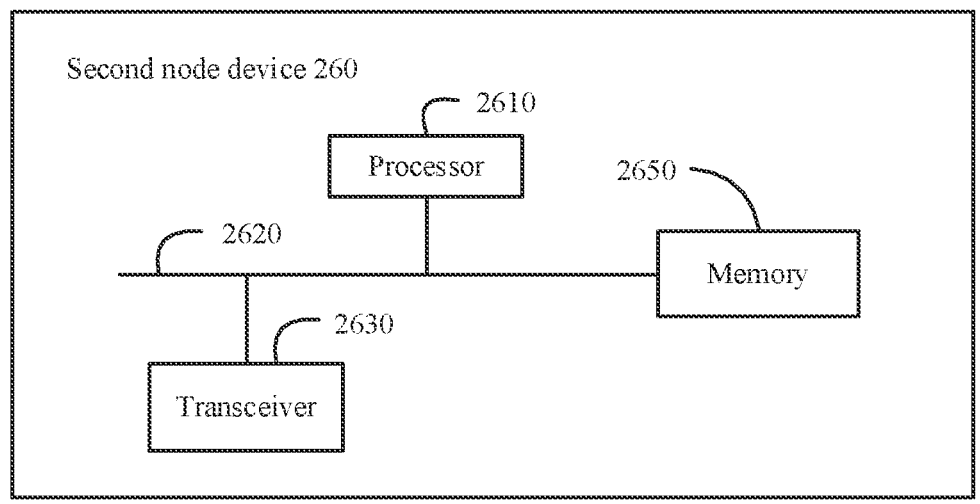
FIG. 26 is a schematic structural diagram of hardware of a second node device according to an embodiment of this application.

FIG. 26 is a schematic structural diagram of hardware of a second node device according to an embodiment of this application. As shown in FIG. 26, the second node device 260 includes at least one processor 2610, a memory 2650, a transceiver 2630, and a bus system 2620.

Functional structures of the at least one processor 2610, the memory 2650, the transceiver 2630, and the bus system 2620 are similar to those in FIG. 24. Details are not described herein again.

In this embodiment, the transceiver 2630 is configured to perform receiving and sending operation steps on a second node device side in the foregoing method embodiments, or is configured to perform steps of sending and receiving data on a second node device side in another optional embodiment.

The processor 2610 is configured to perform a data processing step on the second node device side in the foregoing method embodiments, or is configured to perform a data processing step on the second node device side in the another optional embodiment.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely division into logical functions and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit, or may be implemented in a form of a combination of software and hardware.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An apparatus, comprising:
one or more processors;
a memory coupled to the one or more processors, wherein the memory stores a program to be executed by the one or more processors, the program including instructions for:
receiving, by a terminal device, first data in a first cell, wherein the first cell is a first primary cell and wherein the first data is received incorrectly;
sending, by the terminal device, first indication information in a second cell, wherein the second cell is a secondary cell or a second primary cell, and the first indication information is used to indicate that the first data is incorrect in the first cell, or is used to request transmission of the first data in the second cell; and
receiving, by the terminal device, the first data in the second cell.

2. The apparatus according to claim 1, wherein after the sending first indication information in a second cell, the program further includes instructions for:
detecting a first downlink control channel in the second cell, wherein the first downlink control channel is used to receive the first data.

3. The apparatus according to claim 2, wherein the program further includes instructions for:
sending second indication information in the first cell, wherein the second indication information is used to indicate that the first data is incorrectly received in the first cell, or is used to request transmission of the first data in the first cell; and
receiving the first data in the first cell.

4. The apparatus according to claim 1, wherein the program further includes instructions for:
sending second indication information in the first cell, wherein the second indication information is used to indicate that the first data is incorrectly received in the first cell, or is used to request transmission of the first data in the first cell; and
receiving the first data in the first cell.

5. An apparatus, comprising:
one or more processors;
a memory coupled to the one or more processors, wherein the memory stores a program to be executed by the one or more processors, the program including instructions for:
receiving, in a second cell, first indication information from a terminal device, wherein the first indication information is used to indicate that first data is incorrectly received, by the terminal device, in a first cell, or is used to request, by the terminal device, transmission of the first data in the second cell, the first cell is a first primary cell, and the second cell is a secondary cell or a second primary cell; and
sending, in the second cell, the first data to the terminal device.

6. The apparatus according to claim 5, wherein before the sending, in the second cell, the first data to the terminal device, the program further includes instructions for:
receiving, in the second cell, the first data from a first node device, wherein the first node device is a node device corresponding to the first cell.

7. An apparatus, comprising:
one or more processors;
one or more memories coupled to the one or more processors, wherein the non-transitory memory stores a program to be executed by the one or more processors, the program including instructions for:
sending, in a first cell, first data to a terminal device, wherein the first cell is a first primary cell;
receiving, in a second cell, third indication information from the terminal device, wherein the second cell is a secondary cell or a second primary cell, and the third indication information is used to indicate that the first data is correctly received in the first cell, or is used to request to stop transmission of the first data in the second cell; and
stopping sending the first data in the second cell.

8. The apparatus according to claim 7, wherein the program further includes instructions for:
receiving, in the first cell, fourth indication information from the terminal device, wherein the fourth indication information is used to indicate that the first data is correctly received in the first cell, or is used to request to stop transmission of the first data in the first cell; and
stopping sending the first data in the first cell.

* * * * *